(12) United States Patent
Kawabe et al.

(10) Patent No.: US 10,192,570 B2
(45) Date of Patent: Jan. 29, 2019

(54) MAGNETIC DISK DEVICE AND WRITE METHOD

(71) Applicant: KABUSHIKI KAISHA TOSHIBA, Tokyo (JP)

(72) Inventors: Takayuki Kawabe, Sagamihara Kanagawa (JP); Takeyori Hara, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/694,834

(22) Filed: Sep. 3, 2017

(65) Prior Publication Data

US 2018/0197567 A1 Jul. 12, 2018

(30) Foreign Application Priority Data

Jan. 10, 2017 (JP) .................................. 2017-001877

(51) Int. Cl.
*G11B 5/09* (2006.01)
*G11B 5/012* (2006.01)

(52) U.S. Cl.
CPC ................ *G11B 5/012* (2013.01); *G11B 5/09* (2013.01)

(58) Field of Classification Search
None
See application file for complete search history.

(56) References Cited

U.S. PATENT DOCUMENTS

| | | | | |
|---|---|---|---|---|
| 5,469,414 A | * | 11/1995 | Okamura | G05B 19/416 360/75 |
| 5,497,360 A | * | 3/1996 | Takahara | G11B 7/08529 369/44.28 |
| 5,691,617 A | * | 11/1997 | Funches | G11B 19/02 318/273 |
| 5,859,742 A | * | 1/1999 | Takaishi | G11B 5/5534 360/77.07 |
| 6,014,285 A | * | 1/2000 | Okamura | G05B 19/19 360/78.04 |
| 6,153,997 A | * | 11/2000 | Kobayashi | G11B 5/5521 318/560 |
| 7,457,075 B2 | | 11/2008 | Liu et al. | |
| 7,474,491 B2 | | 1/2009 | Liikanen et al. | |

(Continued)

FOREIGN PATENT DOCUMENTS

JP 2014-089780 A 5/2014

*Primary Examiner* — Peter Vincent Agustin
(74) *Attorney, Agent, or Firm* — Patterson & Sheridan, LLP

(57) ABSTRACT

A magnetic disk device includes a disk, a head configured to write data on the disk, and a controller. The controller generates a target trajectory of the head in a circumferential direction for writing to a plurality of sectors in a current track, wherein the target trajectory is based on an actual trajectory of the head for writing to a plurality of sectors in a previously written track that is adjacent to the current track, determines that the previously written track is discontinuous between an initial sector of the previously written track and an end sector of the previously written track by a radial offset, generates a corrected trajectory for writing the plurality of sectors in the current track, and controls a position of the head in a radial direction based on the corrected trajectory while writing to the plurality of sectors in the current track.

20 Claims, 13 Drawing Sheets

(56) References Cited

U.S. PATENT DOCUMENTS

| | | |
|---|---|---|
| 8,885,284 B2 | 11/2014 | Kashiwagi et al. |
| 8,953,266 B2 | 2/2015 | Dhanda et al. |
| 9,026,728 B1 | 5/2015 | Xi et al. |
| 9,424,870 B2 | 8/2016 | Lee et al. |
| 9,875,763 B1* | 1/2018 | Jury .................. G11B 20/1816 |
| 2018/0197567 A1* | 7/2018 | Kawabe ................ G11B 5/012 |

* cited by examiner

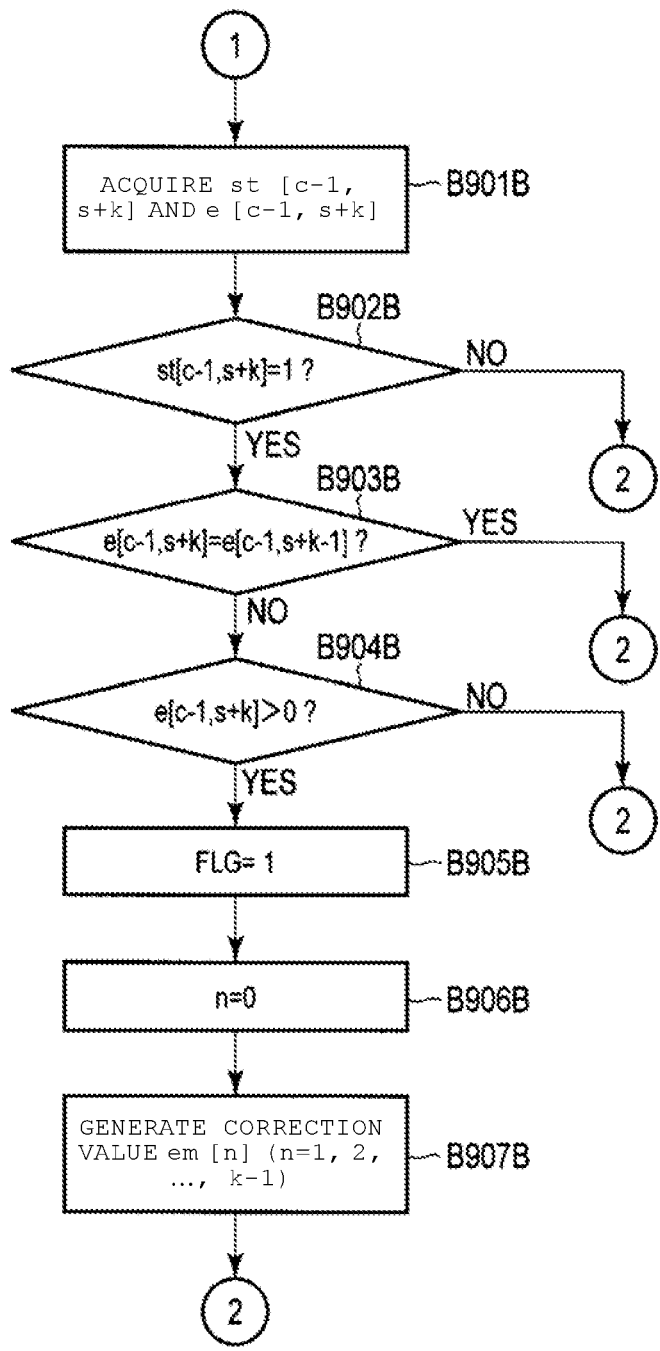

MAGNETIC DISK DEVICE AND WRITE METHOD

CROSS-REFERENCE TO RELATED APPLICATION

This application is based upon and claims the benefit of priority from Japanese Patent Application No. 2017-001877, filed Jan. 10, 2017, the entire contents of which are incorporated herein by reference.

FIELD

Embodiments described herein relate generally to a magnetic disk device and a write method.

BACKGROUND

In recent years, various technologies for high recording capacity magnetic disk devices (for example, HDDs) have been developed. One such technology is magnetic disk devices that write data via shingled write magnetic recording (SMR). When a magnetic disk device writes data on disk via a shingled write magnetic recording, the magnetic disk device writes the current track to overlap parts of a track (hereinafter simply referred to as adjacent tracks) that is written immediately before the current track. Magnetic disk devices can further improve track densities (track per inch (TPI)) of disks by writing data via shingled write magnetic recording rather than via conventional magnetic recording.

Magnetic disk devices control the widths of remaining adjacent tracks, that is, read track widths that do not include overwritten regions of the adjacent tracks, by controlling the width of the regions overwritten on the adjacent tracks. Therefore, magnetic disk devices can control read track widths, for example, with a function (e.g., adaptive track center (ATC) function) that sets target trajectories of current tracks based on positioning error information of adjacent tracks in which data is written.

Magnetic disk devices write current tracks based on adjacent tracks, for example, via the ATC function. In a sector in which data writing starts (hereinafter referred to as a starting sector) in an immediately previously written adjacent track, the data writing may possibly end in the same adjacent track. In addition, the starting sector may possibly deviate from a sector adjacent to the starting sector (hereinafter referred to as an ending sector) in a radial direction of the disk. For example, when a starting sector deviates from an ending sector in a direction in which a subsequent track of a current track is to be written (hereinafter referred to as a forward direction) in a radial direction of the disk, a magnetic disk device writes the current track based on an adjacent track by the ATC function. In this case, a read track width of a region near the starting sector of the adjacent track can be compressed in the radial direction.

DESCRIPTION OF THE DRAWINGS

FIG. 9B is a flowchart illustrating a second portion of the write process by the magnetic disk device according to the first embodiment.

DETAILED DESCRIPTION

Embodiments provide a magnetic disk device and write methods for improving reliability of the magnetic disk device.

A magnetic disk device, according to an embodiment, includes a disk, a head configured to write data on the disk, and a controller. The controller generates a target trajectory of the head in a circumferential direction for writing to a plurality of sectors in a current track, wherein the target trajectory is based on an actual trajectory of the head for writing to a plurality of sectors in a previously written track that is adjacent to the current track, determines that the previously written track is discontinuous between an initial sector of the previously written track and an end sector of the previously written track by a radial offset, generates a corrected trajectory for writing the plurality of sectors in the current track, and controls a position of the head in a radial direction based on the corrected trajectory while writing to the plurality of sectors in the current track.

Hereinafter, embodiments will be described with reference to the drawings. The drawings are exemplary and are not limiting the scope of the embodiments described herein.

First Embodiment

Figure 1:
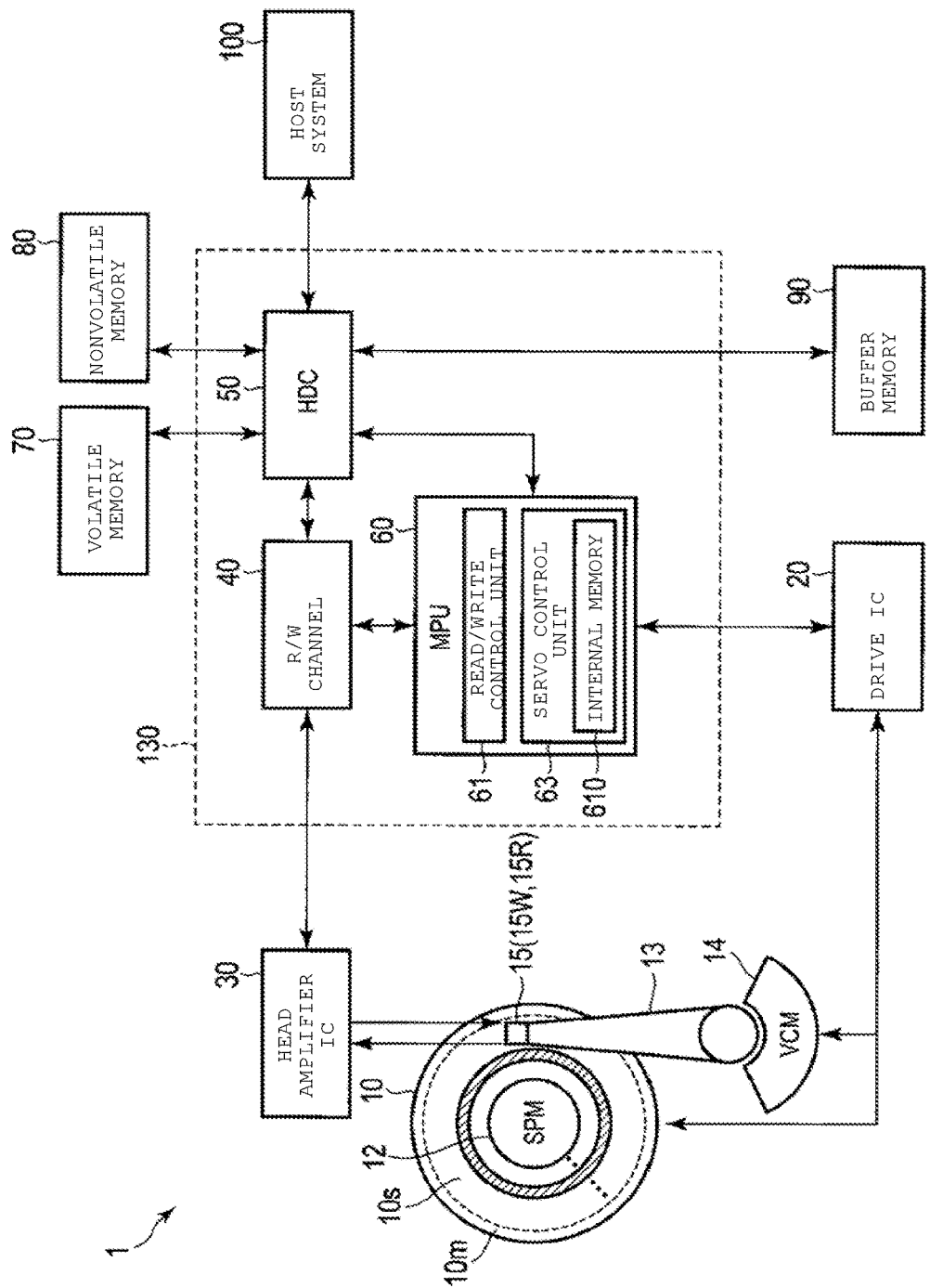
FIG. 1 is a block diagram illustrating the configuration of a magnetic disk device according to a first embodiment.

FIG. 1 is a block diagram illustrating the configuration of a magnetic disk device 1 according to a first embodiment.

The magnetic disk device 1 includes a head-disk assembly (HDA), a driver IC 20, head amplifier integrated circuit (hereinafter referred to as a head amplifier IC) 30, a volatile memory 70, a nonvolatile memory 80, a buffer memory 90, and a system controller 130 which is a one-chip integrated circuit, and is described below. The magnetic disk device 1 is connected to a host system 100.

The HDA includes a magnetic disk (hereinafter referred to as a disk) 10, a spindle motor (SPM) 12, an arm 13 on which a head 15 is mounted, and a voice coil motor (VCM) 14. The disk 10 is rotated by the spindle motor 12. The arm 13 and the VCM 14 position an actuator. The actuator controls movement of the head 15 mounted on the arm 13 to a target radius position on the disk 10 by driving of the VCM 14. Two or more disks 10 and two or more heads 15 may be included in the magnetic disk device 1.

In the disk 10, a shingled recording region (SMR region) 10s and a media cache region 10m are included in a data region. In the shingled recording region 10s, user data or the like is recorded in response to write requests from the host 100. The media cache region 10m can be used as a cache for the shingled recording region 10s. The shingled recording region 10s is a recording region that has a higher track density (track per inch (TPI)) than the media cache region 10m, since data of a current target track (hereinafter simply referred to as a current track) is written to overlap a part of an immediately previously written adjacent track (hereinafter simply referred to as an adjacent track). The shingled recording region 10s includes a plurality of track groups (hereinafter referred to as band regions) in which a plurality of tracks included therein are overwritten. The band region includes at least one track that is partially overwritten by an adjacent track, and most recently written track. The second track has a broader track width than the first track since the second track is not overwritten by other tracks, such as subsequently written tracks that are written using SMR. Hereinafter, a "track" refers to a "write track". In addition, a term. "track" is can refer to both a "write track" and a "read track" in some cases.

Figure 2:
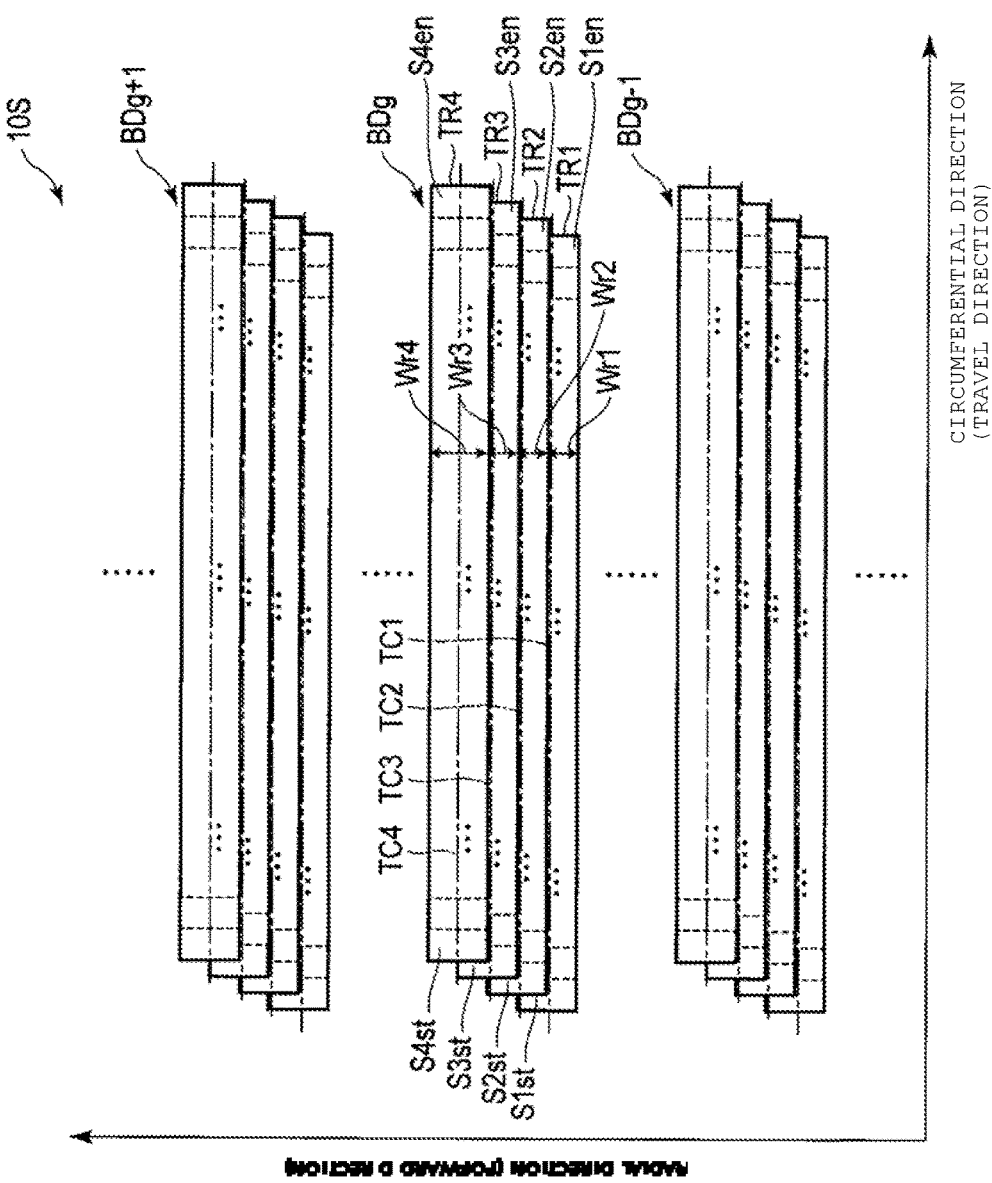
FIG. 2 is a schematic diagram illustrating a shingled recording region.

FIG. 2 is a schematic diagram illustrating an example of a shingled recording region 10s. In FIG. 2, the horizontal axis represents a circumferential or rotation direction of the disk 10 and the vertical axis represents as a radial direction of the disk 10 orthogonal to the circumferential direction. Hereinafter, a direction in which data is sequentially written in the radial direction of the disk 10 is referred to as a forward direction. A direction in which data is sequentially written in the circumferential direction of the disk 10 is referred to as a travel direction. The forward direction is a direction parallel to the radial direction and the travel direction is a direction parallel to the circumferential direction. In FIG. 2, the forward direction is the same direction as the radial direction and the travel direction is the same direction as the circumferential direction. In other embodiments, the forward direction may be an opposite direction to the radial direction. In addition, in some embodiments, the travel direction may be an opposite direction to the circumferential direction.

FIG. 2 illustrates a band region BDg-1, a band region BDg, and a band region BDg+1, all written in the shingled recording region 10s. In FIG. 2, the band region BDg-1, the band region BDg, and the band region BDg+1 are written in this order. Hereinafter, the description will be focused on the band region BDg. Since the band region Bdg shares the same configuration as that of the band region BDg-1 and the band region BDg+1, the description of band region BDg-1 and the band region BDg+1 will be omitted. In FIG. 2, to facilitate the description herein, each track is illustrated along a straight line in the circumferential direction, but in practice is actually a curved line encircling the disk 10 once. In FIG. 2, to facilitate the description, variation in a track by a positioning error caused by mechanical disturbances during the writing process, and the like, is not illustrated.

The band region BDg includes first tracks TR1, TR2, and TR3 and a second track TR4. In the band region BDg, track centers TC1, TC2, TC3, and TC4 are defined as trajectories substantially concentric to the center of the disk 10. In the band region BDg, each of the first tracks TR1, TR2, and TR3 and the second track TR4 includes a plurality of sectors defined as a plurality of lines drawn radially from the inner diameter side to the outer diameter side of the disk 10.

In the first track TR1, a sector in which data writing starts (hereinafter referred to as a starting sector) S1$st$ to a sector in which the data writing ends (hereinafter referred to as an ending sector) S1$en$ are sequentially written along the track center TC1. For example, the starting sector includes a sector in which data is first written when a track jumps from an adjacent track to a current track (hereinafter referred to as a first sector in some cases). The ending sector includes a sector serving as an origin point when a track jumps from the current track to a subsequent track (hereinafter referred to as a final sector in some cases). In the description herein, the starting sector S1$st$ is referred to as a first sector S1$st$ and the ending sector S1$en$ is referred to as a final sector S1$en$. Therefore, in the first track TR1, the starting sector S1$st$ and the ending sector S1$en$ are actually adjacent to each other in the circumferential direction.

In the first track TR2, a starting sector S2$st$ to an ending sector S2$en$ are sequentially written along the track center TC2. In the description herein, the starting sector S2$st$ is referred to as a first sector S2$st$ and the ending sector S2$en$ is referred to as a final sector S2$en$. Therefore, in the first track TR2, the starting sector S2$st$ and the ending sector S2$en$ are actually adjacent to each other in the circumferential direction. In the embodiment illustrated in FIG. 2, the first track TR2 is located at a position deviating from the first track TR1 in the radial direction to overlap a part of the first track TR1.

In the first track TR3, a starting sector S3$st$ to an ending sector S3$en$ are sequentially written along the track center TC3. In the description written herein, the starting sector S3$st$ is referred to as a first sector S3$st$ and the ending sector S3$en$ is referred to as a final sector S3$en$. Therefore, in the first track TR3, the starting sector S3$st$ and the ending sector S3$en$ are actually adjacent to each other in the circumferential direction. The first track TR3 is located at a position deviating from the first track TR2 in the radial direction to overlap a part of the first track TR2.

In the second track TR4, a starting sector S4$st$ to an ending sector S4$en$ are sequentially written along the track center TC4. In the description written herein, the starting sector S4$st$ is referred to as a first sector S4$st$ and the ending sector S4$en$ is referred to as a final sector S4$en$. Therefore, in the second track TR4, the starting sector S4$st$ and the ending sector S4$en$ are actually adjacent to the circumferential direction. The second track TR4 is located at a position deviating from the first track TR3 in the radial direction to overlap a part of the first track TR3. A read track width Wr4 of the second track TR4 is greater than each of read track widths Wr1, Wr2, and Wr3 of the first tracks TR1, TR2, and TR3. The read track width is a difference value between the track width and the width of a position overlapping an adjacent track. For example, the read track widths Wr1, Wr2, and Wr3 are substantially equal to each other. That is, track pitches of the first track TR1 to the second track TR4 are constant. Each of the starting sectors S1$st$, S2$st$, S3$st$, and S4$st$ may be located at different positions in the circumferential direction of each track. Each of the ending sectors S1en, S2en, S3en, and S4en may also be located at different positions in the circumferential direction of each track. A single starting sector and ending sector is described above for each of the first tracks TR1, TR2, and TR3 and the second track TR4, but there may instead be multiple starting sectors and ending sectors for each of the first tracks TR1, TR2, and TR3 and the second track TR4. In this case, in a given track, an ending sector of one set of data that is sequentially written is adjacent to a starting sector of the next subsequently written set of data in that track. The band region BDg includes 4 tracks, as described above, but may include tracks more or fewer than 4 tracks.

In FIG. 1, the head 15 has a slider as a body and includes a write head 15W and a read head 15R mounted on the slider. The write head 15W writes data on the disk 10. The read head 15R reads data recorded in a data track on the disk 10. Writing can be expressed as recording in some cases.

The driver IC 20 controls operation of the SPM 12 and the VCM 14 based on the control of the system controller 130 (specifically, an MPU 60 to be described below).

The head amplifier IC 30 includes a read amplifier and a write driver. The read amplifier amplifies a read signal read by the read head 15R and transmits the amplified read signal to the read/write (R/W) channel 40. The write driver transmits a write current in accordance with the write data output from the R/W channel 40 to the write head 15W.

The volatile memory 70 is a semiconductor memory in which stored data is lost when supply of power is cut off. The volatile memory 70 stores data or the like necessary for the operation of various elements of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when supply of power is cut off. The nonvolatile memory 80 is, for example, a NOR type or NAND type flash read-only memory (ROM) (FROM).

The buffer memory 90 is a semiconductor memory that temporarily records data transmitted and received between the magnetic disk device 1 and the host 100. The buffer memory 90 may be configured to be integrated within the volatile memory 70. The buffer memory 90 is, for example, a dynamic random access memory (DRAM), a static random access memory (SRAM), an SDRAM, a ferroelectric random access memory (FeRAM), or a magnetoresistive random access memory (MRAM).

The system controller (controller) 130 is implemented as, for example, a large scale integrated circuit (LSI) called a system-on-a-chip (SoC), in which a plurality of elements are integrated into a single chip. The system controller 130 includes a read/write (R/W) channel 40, a hard disk controller (HDC) 50, and a microprocessor (MPU) 60.

The R/W channel 40 executes signal processing on read data and write data. The R/W channel 40 has a circuit or other functionality for measuring a signal equality of read data. The R/W channel 40 acquires access information from the disk 10. The access information includes positional information of the head 15 (hereinafter simply referred to as positional information), a track number, the position of a starting sector on the disk 10, a sector number of the starting sector, the position of an ending sector on the disk 10, a sector number of the ending sector, and a time at which data is written on each track. The positional information includes a positioning error. The positioning error is a deviation from an actual position of the center (hereinafter simply referred to as an actual position of the head 15) of the head 15 (the write head 15W) with respect to a target position of the center (hereinafter simply referred to as a target position) of the head 15 (in particular, the write head 15W) in each sector of a particular track on the disk 10, that is, with respect to a central position of a data pattern of the written sector (hereinafter simply referred to as a sector). Hereinafter, the central position of the head 15 (in particular, the write head 15W) is simply referred to as the head 15. The track number is a numerical value that is allocated to each track sequentially written in the forward direction on the disk 10. and increases by a constant value in the forward direction. The sector number is a numerical value allocated to each sector in the travel direction of each track and increases by a constant value in the travel direction from the starting sector to the ending sector of each track. Hereinafter, to facilitate description of an operation, for sector numbers, the same numerical value is assumed to be allocated to sectors at the same position in the circumferential direction in all the tracks. For example, the sector number of a certain sector is the same numerical value as the sector number of a sector of a track that is adjacent to the specific sector in the radial direction. For sector numbers, different numerical values are allocated to sectors at the same position in the circumferential direction.

The HDC 50 controls data transmission between the host 100 and the R/W channel 40 in response to an instruction from the MPU 60 to be described below.

The MPU 60 is a main controller that controls each unit of the magnetic disk device 1. The MPU 60 controls the VCM 14 via the driver IC 20 such that servo control is executed to position the head 15. The MPU 60 controls a write operation for writing data on the disk 10 and selects a storage destination for the write data transmitted from the host 100.

The MPU 60 includes a read/write control unit 61 and a servo control unit 63. The read/write control unit 61 and the servo control unit 63 of the MPU 60 may be implemented via firmware.

The read/write control unit 61 controls read and write operations in response to commands. For example, the read/write control unit 61 moves the head 15 to each track via the servo control unit 63 and writes data along a target trajectory of the head 15 in each track (hereinafter referred to as a target trajectory). For example, the target trajectory is defined in a path in which a target position in each sector of a track in the circumferential direction is connected. The target trajectory is indicated as a target track or a target trajectory in some cases. The read/write control unit 61 sequentially executes shingled write magnetic recording on data for each band region in the shingled recording region 10s of the disk 10. For example, the read/write control unit 61 determines a target trajectory for a certain track as a track center of the track and executes the shingled write magnetic recording of each track on the disk 10 at a specific track pitch. When writing data in SMR region 10s, the read/write control unit 61 selects a target trajectory to overwriting a portion of a previously written track in the band region. The read/write control unit 61 can also write data on the disk 10 in normal write magnetic recording rather than shingled write magnetic recording.

The servo control unit 63 executes positioning control of the head 15 based on positional information of the head 15. That is, the servo control unit 63 controls the VCM 14 via the driver IC 20 based on the positional information for the head 15 received from the R/W channel 40. The servo control unit 63 includes an internal memory 610. The servo control unit 63 records the positional information for the head 15 received from the R/W channel 40 in a memory, for example, the internal memory 610, the volatile memory 70, or the nonvolatile memory 80. Alternatively, the servo control unit 63 may not include the internal memory 610.

For example, the servo control unit 63 generates a target trajectory of a current track based on an immediately previously written adjacent track (hereinafter referred to as an adjacent track) that is adjacent to the current track and is on the side of the current track that is opposite to the forward direction. For example, the servo control unit 63 generates a correction value for a target position in a sector of the current track (or multiple respective correction values for multiple sectors of the current track), where the sector of the current track is located in the radial direction from a sector of the adjacent track. The correction value is based on a positioning error from a particular sector of the adjacent track. The servo control unit 63 generates each correction value of the target position in each sector of the current track based on the positioning error associated with each sector of the adjacent track. The servo control unit 63 generates a target trajectory for the current track based on the correction value of each sector of the current track, or for a plurality of sectors of the current track. The servo control unit 63 controls the position of the head 15 in the current track based on the generated target trajectory of the current track. An adaptive track center (ATC) function is one example of a function for generating the target trajectory in the current track based on the positioning error of the adjacent track in this way. Hereinafter, to facilitate the description, this function is referred to as ATC, but embodiments are not limited to the ATC function. A function may be used other than the ATC function as long as the same process is possible. The servo control unit 63 controls the read track widths of the adjacent track and the current track by controlling the position of the head 15 in the current track based on the target trajectory generated through the ATC (or another) function.

Further, the servo control unit 63 generates a corrected trajectory that is obtained by correcting the target trajectory generated through the ATC function. The servo control unit 63 generates the corrected trajectory based on the offset direction and the positioning error of one or more particular sectors of the adjacent track. For example, the servo control unit 63 generates a correction value of the target position generated through the ATC function on a particular sector of the current track that is located in the forward direction from the particular sector of the adjacent track. The servo control unit 63 generates the correction value of the target position based on the positioning error of the particular sector of the adjacent track. The servo control unit 63 generates each correction value of target positions for several sectors of the current track based on the offset amount and the offset direction of a particular sector of the adjacent track, e.g., the initial sector of the adjacent track. Based on these correction values of several sectors, the servo control unit 63 generates a corrected trajectory obtained by correcting the target trajectory that is generated based on the adjacent track via the ATC function. Based on the generated corrected trajectory, the servo control unit 63 prevents the read track width of the adjacent track from being compressed by controlling the position of the head 15 in the current track. Irrespective of the offset amount of a particular sector of the adjacent track, the servo control unit 63 may be configured to generate the corrected trajectory that is obtained by correcting the target trajectory generated through the ATC function.

Figure 3:
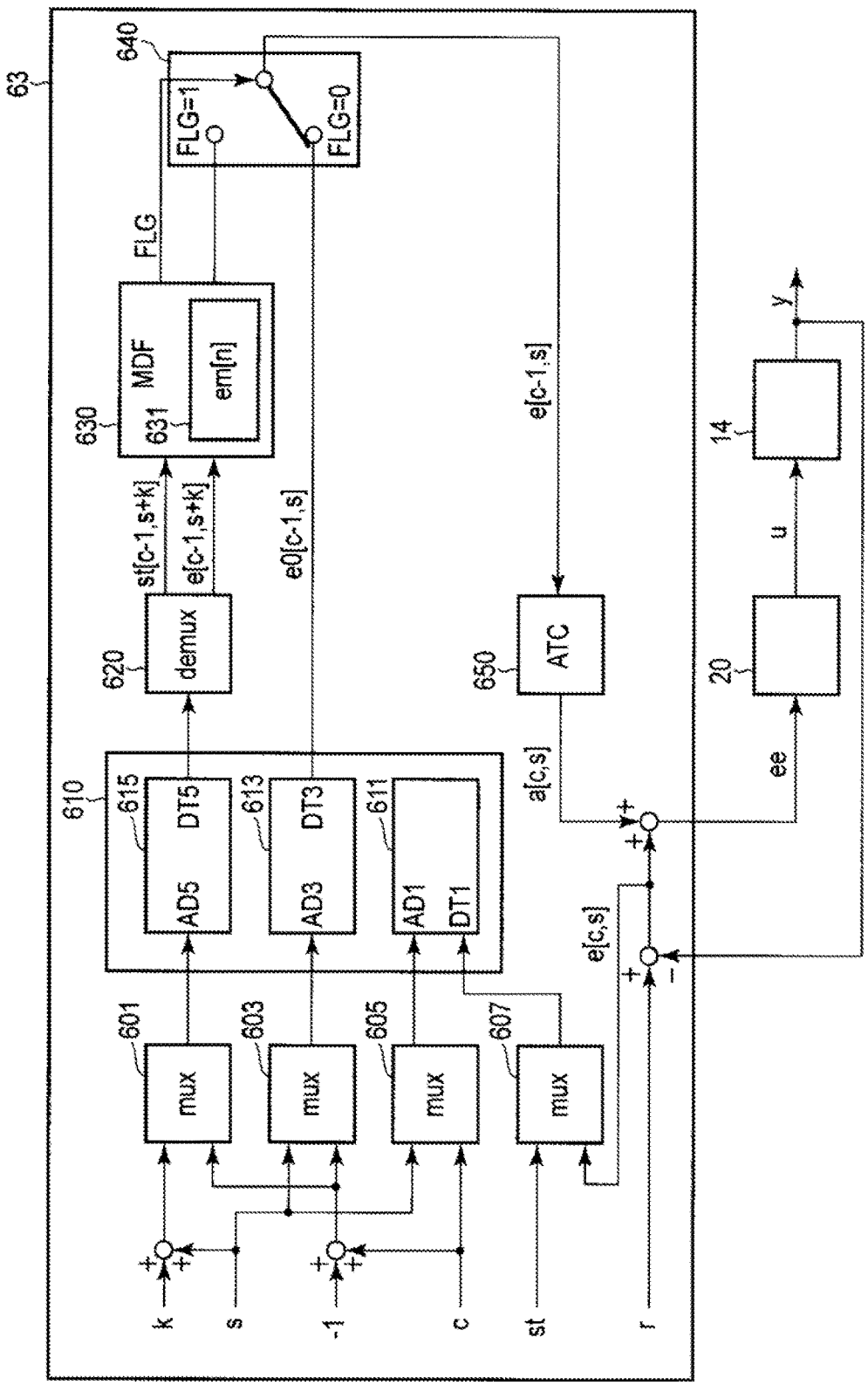
FIG. 3 is a block diagram illustrating a servo control unit.

FIG. 3 is a block diagram illustrating an example of the configuration of the servo control unit 63. FIG. 3 illustrates the number of sectors k, a sector number s (hereinafter simply referred to as a current sector number) of a current target sector (hereinafter simply referred to as a current sector) in the current track s, a track number c of the current track (hereinafter simply referred to as a current track number (or cylinder number)), a bit st indicating a starting sector (hereinafter simply referred to as a bit), a positioning error e, a target position r in the current sector number s, a correction value a of the position of the head 15 with respect to the target position r, an offset amount ee of the head 15 with respect to the target position r in the radial direction, a control signal u, and a position y of the head 15. The target position r and the position y of the head 15 are values for which the track center is set as 0, the forward direction is positive with reference to the track center, and the opposite direction to the forward direction is negative with reference to the track center in each track. In FIG. 3, the number of sectors k, the current sector number s, the current track number c, the bit st, the positioning error e, the correction value a, the target position r, the offset amount ee, and the position y of the head 15 are transmitted and received as signals. In FIG. 3, paths of main signals are illustrated and the modules illustrated in FIG. 3 can transmit and receive one or more signals as shown. Each unit transmits and receives a signal or data necessary for the process of controlling the position of the head 15. Hereinafter, the sector s is represented using the sector number s and the track c is represented using the track number c.

The MPU 60 includes multiplexers (mux) 601, 603, 605, and 607, the internal memory 610, a demultiplexer (demux) 620, a correction unit 630, a switch unit 640, and an ATC processing unit 650.

Each of the multiplexers 601, 603, 605, and 607 outputs two or more input signals as one signal. Each of the multiplexers 601, 603, 605, and 607 is electrically connected to the internal memory 610.

A sector number s+k obtained by adding the number of sectors k to the current sector number s and a track number obtained by adding "−1" to the current track number c, that is, a track number c−1 for the adjacent track (hereinafter referred to as a previous track number), are input to the multiplexer 601. The multiplexer 601 outputs the input previous track number c−1 and sector number s+k as address information [c−1, s+k] to, for example, the internal memory 610.

A signal indicating the current sector number s and a signal indicating the previous track number c−1 are input to the multiplexer 603. The multiplexer 603 outputs the input previous track number c−1 and current sector number s as address information [c−1, s] to, for example, the internal memory 610.

The current sector number s and the current track number c are input to the multiplexer 605. The multiplexer 605 outputs the input current track number c and current sector number s as address information [c, s] to, for example, the internal memory 610.

The bit st corresponding to the current sector s of the current track c (hereinafter referred to as the current bit [c, s]) and the positioning error e [c, s] of the current sector of the current track (hereinafter referred to as a current positioning error) are input to the multiplexer 607. The multiplexer 607 outputs the bit st and the current positioning error e [c, s] as one signal to, for example, the internal memory 610.

The internal memory 610 records the data input from the multiplexers 601, 603, 605, and 607. The internal memory 610 includes a write access unit 611 and read access units 613 and 615. The internal memory 610 may be installed separated from the servo control unit 63. In some embodiments, the internal memory 610 may not be included in the servo control unit 63. In such embodiments, instead of the internal memory 610, the volatile memory 70 or the nonvolatile memory 80 is used.

The write access unit 611 writes data in the internal memory 610. The write access unit 611 includes terminals AD1 and DT1. The write access unit 611 designates the current sector of the address information [c, s] (hereinafter referred to as a current sector [c, s]) input from the multiplexer 605 as a target of the terminal AD1. The write access unit 611 records the current positioning error e [c, s] and the current bit st [c, s] as one piece of data corresponding to the current sector [c, s] in the internal memory 610 via the terminal DT1.

The read access unit 613 can read the data recorded in the internal memory 610. The read access unit 613 includes terminals AD3 and DT3. The read access unit 613 designates a sector of the address information [c−1, s] (hereinafter referred to as a sector [c−1, s]) input from the multiplexer 603 as a target of the terminal AD3. The read access unit 613 reads a positioning error e0 [c−1, s] corresponding to the sector [c−1, s] and outputs the positioning error e0 [c−1, s] to the switch unit 640 via the terminal DT3.

The read access unit 615 can read the data recorded in the internal memory 610. The read access unit 615 includes terminals AD5 and DT5. The read access unit 615 designates a sector of the address information [c−1, s+k] (hereinafter referred to as a sector [c−1, s+k]) input from the multiplexer 601 as a target of the terminal AD5. The read access unit 615 reads data including a bit st [c−1, s+k] and a positioning error e [c−1, s+k] corresponding to the sector [c−1, s+k] and outputs the data to the demultiplexer 620 via the terminal DT5.

The demultiplexer 620 receives one signal as an input and outputs the signal as a plurality of signals. The demultiplexer 620 divides the data including the positioning error e [c−1, s+k] and the bit st [c−1, s+k] input from the read access unit 615 into the positioning error e [c−1, s+k] and the bit st [c−1, s+k] and outputs the positioning error e [c−1, s+k] and the bit st [c−1, s+k] to the correction unit 630.

Referring to the input signal, the correction unit 630 detects the starting sector of an adjacent track (hereinafter simply referred to as a starting sector) that is separated from the current sector of the current track in the travel direction, i.e., in the direction parallel to the circumferential direction. When the correction unit 630 detects the starting sector of the adjacent track, which is separated from the current sector of the current track in the travel direction, for example, the correction unit 630 compares the positioning error in the starting sector of the adjacent track to the positioning error in the ending sector (hereinafter simply referred to as an ending sector) and detects whether the position of the center of the starting sector deviates from the position of the center of the ending sector in the radial direction. That is, the correction unit 630 detects whether the target trajectory is discontinuous or continuous at a boundary position of the adjacent track between the starting sector and the ending sector. When the correction unit 630 detects that the starting sector and the ending sector deviate from each other in the radial direction by a radial distance sufficient to be considered discontinuous, the correction unit 630 detects an actual position of the head 15 with respect to a target position of the starting sector of the adjacent track, that is, with respect to an offset direction and an offset amount of the central position of a data pattern of the written starting sector. The correction unit 630 generates a correction value for correcting the target position according to the offset direction and the offset amount of the starting sector of the adjacent track with respect to the target position of the starting sector of the adjacent track. The correction unit 630 may include a memory in which the positioning error or the like of an immediately preceding sector of the current sector is also recorded. The correction unit 630 may record a plurality of such input positioning errors.

For example, the correction unit 630 generates a correction value when the correction unit 630 detects that the starting sector and the ending sector of the adjacent track deviate from each other in the radial direction, i.e., the starting sector of the adjacent track is offset (positively or negatively) in the forward direction with respect to the target position. In the example illustrated in FIG. 3, the correction unit 630 detects the input positioning error e [c−1, s+k] and bit st [c−1, s+k] and detects the starting sector separated in the travel direction in the current sector of the current track. When the correction unit 630 detects a rising bit st [c−1, s+k] (for example, st [c−1, s+k]=1), the correction unit 630 determines that the sector [c−1, s+k] corresponding to the bit st [c−1, s+k] is the starting sector. The correction unit 630 compares the positioning error e [c−1, s+k] of the starting sector [c−1, s+k] of the adjacent track c−1 to a positioning error e [c−1, s+k−1] of an ending sector [c−1, s+k−1] and detects whether the starting sector [c−1, s+k] deviates from the ending sector [c−1, s+k−1] in the radial direction by more than a threshold quantity, such as a certain fraction of a track width. When the correction unit 630 determines that the starting sector [c−1, s+k] deviates from the ending sector [c−1, s+k−1] in the radial direction, the correction unit 630 detects whether the positioning error e [c−1, s+k] in the starting sector [c−1, s+k] of the adjacent track c−1 is greater than zero "0" (e [c−1, s+k]>0) or is equal to or less than zero "0" (e [c−1, s+k]≤0). That is, the correction unit 630 detects whether the starting sector [c−1, s+k] is offset in the forward direction with respect to the target position in the adjacent track or in the opposite direction to the forward direction. When the correction unit 630 detects that the positioning error e [c−1, s+k] is greater than zero (e [c−1, s+k]>0), the correction unit 630 determines that the starting sector [c−1, s+k] is offset with respect to the target position in the forward direction in the adjacent track. When the correction unit 630 detects that the starting sector [c−1, s+k] deviates from the ending sector [c−1, s+k−1] in the radial direction in the adjacent track and detects that the starting sector [c−1, s+k] is offset with respect to the target position in the forward direction in the adjacent track, the correction unit 630 generates a correction value for correcting the target position of each sector from the sector [c, s] to the sector [c, s+k] according to an offset amount of the starting sector [c−1, s+k]. For example, the correction unit 630 generates correction values em [n] (where n=1, 2, . . . , k−1) for sectors from the sector [c, s] to the sector [c, s+k] so that the head 15 passes through a corrected trajectory continuously connecting the target position of the current sector [c, s] to the target position of the sector [c, s+k] advancing by k sectors from the current sector [c, s] in the current track. The correction unit 630 stores the plurality of generated correction values em [n] (where n=1, 2, . . . , k−1) in the table 631. The correction values em [1], em [2], em [k−1] are positioning errors obtained by correcting the positioning errors in sectors [c,s+1], [c, s+2], . . . , and [c, s+k−1]. That is, the correction values em [1], em [2], em [k−1] respectively correspond to target positions of the sectors [c,s+1], [c, s+2], . . . , and [c, s+k−1]. When the correction unit 630 detects that the starting sector [c−1, s+k] deviates from the ending sector [c−1, s+k−1] in the adjacent track and the starting sector [c−1, s+k] is offset with respect to the target position of the starting sector [c−1, s+k] in the forward direction, the correction unit 630 outputs a flag FLG for selecting a correction value, for example, a signal with FLG=1, to the switch unit 640. The correction unit 630 outputs the generated correction value em [n] to the switch unit 640. For example, the correction unit 630 outputs the correction value em [1] at a time at which the head 15 moves from the current sector s to the subsequent sector s+1. The correction unit 630 outputs the correction values em [1] to em [k−1] every time sector switching takes place. At this time, the correction unit 630 may sequentially output the correction values em [1] to em [k−1] to the switch unit 640 at specific times or may sequentially output the correction values em [1] to em [k−1] to the switch unit 640 in synchronization with the input sector numbers s. After the correction unit 630 outputs the correction value em [k−1] to the switch unit 640, the correction unit 630 outputs a signal for clearing the flag FLG, for example, FLG=0, to the switch unit 640.

The correction unit 630 may be configured to compare a difference value between the positioning error of the starting sector and the positioning error of the ending sector to a threshold when the correction unit 630 detects that the starting sector deviates from the ending sector in the radial direction. When the difference value is greater than the threshold, the correction unit 630 may detect an offset direction of the starting sector with respect to the target position of the starting sector of the adjacent track.

After the correction unit 630 detects the offset direction and the offset amount of the starting sector with respect to the target position in the adjacent track, the correction unit 630 detects the ending sector of the adjacent track and detects an actual position of the head 15 in the ending sector with respect to the target position. That is, the correction unit 630 detects the offset direction and the offset amount of the head 15 from the central position of the data pattern of the written ending sector. The correction unit 630 may be configured to generate a correction value for correcting the target position of the current track according to the offset direction and the offset amount of the starting sector (of the adjacent track) and the ending sector (of the adjacent track) with respect to the target position of the adjacent track. In this case, the correction unit 630 may be configured to generate a correction value for correcting the target position of the current track according to the offset direction and the offset amount of the starting sector (of the adjacent track) with respect to the target position of the adjacent track and the offset direction of the ending sector (of the adjacent track) with respect to the target position.

For example, when the correction unit 630 determines that the sector [c−1, s+k] is a starting sector, the correction unit 630 determines that the immediately preceding sector [c−1, s+k−1] of the starting sector [c−1, s+k] is an ending sector. After the correction unit 630 detects the offset direction and the offset amount of the starting sector [c−1, s+k] with respect to the target position in the adjacent track c−1, the correction unit 630 detects whether the positioning error [c−1, s+k−1] in the ending sector [c−1, s+k−1] of the adjacent track c−1 is less than zero "0" (e [c−1, s+k−1]<0) or is equal to or greater than zero "0" (e [c−1, s+k−1]≥0). That is, the correction unit 630 detects whether the sector [c−1, s+k−1] of the adjacent track is offset in the opposite direction to the forward direction or in same direction as the forward direction with respect to the target position. When the correction unit 630 detects that the positioning error e [c−1, s+k−1] is less than zero, the correction unit 630 determines that the ending sector [c−1, s+k−1] of the adjacent track is offset in the opposite direction of the forward direction with respect to the target position. When the correction unit 630 detects that the starting sector [c−1, s+k] of the adjacent track is offset in the forward direction with respect to the target position and detects that the ending sector [c−1, s+k−1] of the adjacent track is offset in the opposite direction to the forward direction with respect to the target position, the correction unit 630 generates a correction value for correcting the target position of each sector from the sector [c, s] to the sector [c, s+k] according to the offset amount of the starting sector [c−1, s+k].

When the correction unit 630 detects that the starting sector deviates from the ending sector in the radial direction in the adjacent track and detects that the starting sector is offset in the forward direction with respect to the target position in the adjacent track, the correction unit 630 may be configured to generate a correction value for correcting the target position irrespective of an offset amount detected for the starting sector of the adjacent track.

The switch unit 640 selects whether the generated target position is corrected through the ATC function or the target position is corrected through a normal uncorrected ATC function. For example, the switch unit 640 switches a signal received from the correction unit 630, for example, a signal to be output based on the flag FLG. When the flag FLG, for example, FLG=1, is input from the correction unit 630, the switch unit 640 switches to the input terminal from the correction unit 630 and outputs the correction value em [n] (where n=1, 2, . . . , k) input from the correction unit 630 as the positioning error e [c−1, s] of the adjacent track to the ATC processing unit 650. That is, the switch unit 640 selects a mode in which a target position generated through the ATC function is corrected. When a signal for clearing the flag FLG is input from the correction unit 630, for example, a signal in which FLG=0 is set, the switch unit 640 switches to the input terminal from the memory 610 and outputs the positioning error e0 [c−1, s] input from the read access unit 613 of the memory 610 as the positioning error e [c−1, s] of the adjacent track to the ATC processing unit 650. That is, the switch unit 640 selects a mode in which a target position is corrected through the normal ATC function, i.e., the output of the ATC function is not corrected. When the flag FLG, for example, the signal in which FLG=1 is set, is not input from the correction unit 630, the switch unit 640 may be configured to output the positioning error e0 [c−1, s] input from the read access unit 613 as the positioning error e [c−1, s] of the adjacent track to the ATC processing unit 650.

The ATC processing unit 650 generates a correction value for the target position r in the current sector s of the current track c based on the positioning error of the adjacent track input from the switch unit 640. For example, the ATC processing unit 650 generates a correction value a [c, s] for the target position r of the current sector s by executing a process such as gain correction or phase correction on the positioning error e [c−1, s] input from the switch unit 640. The ATC processing unit 650 outputs the generated correction value a [c, s] to the driver IC 20.

The offset amount ee obtained by adding the positioning error e [c, s] of the current sector to the correction value a [c, s] output from the ATC processing unit 650 is input to the driver IC 20. The current positioning error e [c, s] is a difference value between the position y of the head 15 and the target position r. For example, the current positioning error may be defined as e [c, s]=r−y. The driver IC 20 outputs the control signal u to the VCM 14, where the control signal u is for setting the input offset amount ee for the target position r to zero.

The VCM 14 moves the head 15 to the position y by the current sector s of the current track c according to the input control signal u. For example, the VCM 14 moves the head 15 to the position y by the offset amount ee from the target position r by the current sector s of the current track c.

Figure 4:
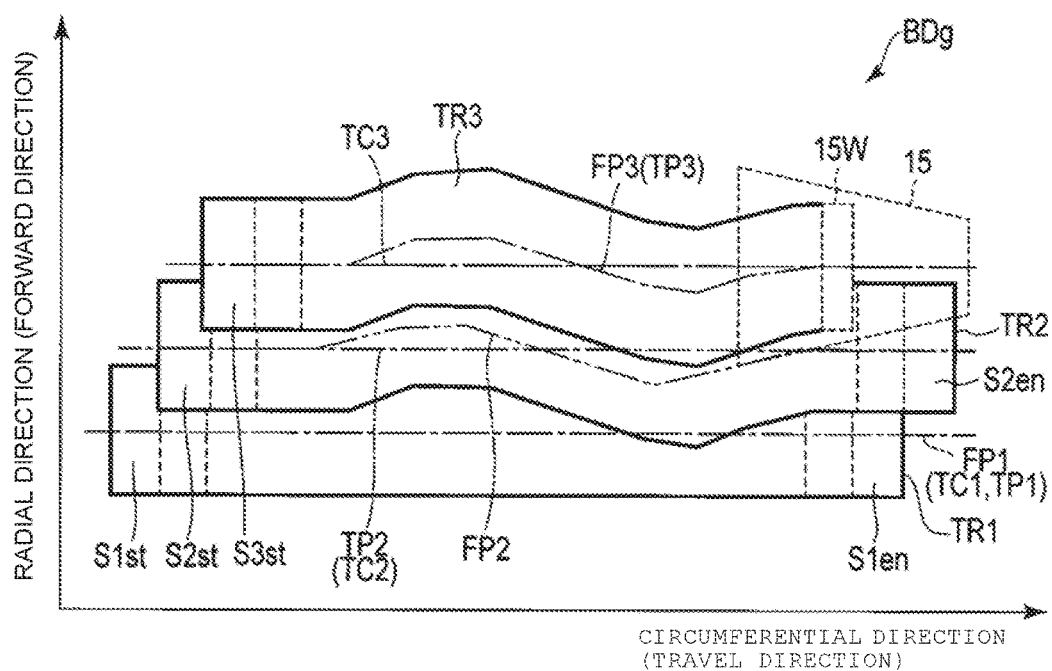
FIG. 4 is a schematic diagram illustrating tracks written through an ATC function.

FIG. 4 is a schematic diagram illustrating an example of tracks written through an ATC function. In FIG. 4, tracks written in the band region BDg via, for example, the ATC function will be described. In the band region BDg of FIG. 4, the same reference numerals are given to substantially the same portions as the band region BDg illustrated in FIG. 2 and a detailed description thereof is omitted. FIG. 4 illustrates a state in which tracks are written in the band region BDg. In FIG. 4, the tracks TR1, TR2, and TR3 are indicated. In FIG. 4, a position error occurs in the track TR2. In FIG. 4, a target trajectory TP1 along the track center TC1 of the track TR1 and an actual trajectory (hereinafter simply referred to as a trajectory) FP1 at the central position of the data pattern of the track TR1 written along the target trajectory TP1 and the track center TC1 of the track TR1 in the radial direction are indicated. In FIG. 4, a target trajectory TP2 of the track TR2 along the trajectory FP1 of the track TR1 and a trajectory FP2 of the track TR2 are indicated. In FIG. 4, a target trajectory TP3 of the track TR3 along the trajectory FP2 of the track TR2 and a trajectory FP3 of the track TR3 are indicated.

The MPU 60 writes the track TR1 along the trajectory FP1 setting the track center TC1 as the target trajectory TP1. The MPU 60 detects positional information or the like at the time of writing the track TR1. Next, the MPU 60 writes the track TR2 along the target trajectory TP2, setting the trajectory FP1 of the track TR1 as the target trajectory TP2 via the ATC function. When the track TR2 is written along the target trajectory TP2, a positioning error occurs in the target trajectory TP2 due to a mechanical disturbance or the like. Consequently, the MPU 60 writes the track TR2 along the trajectory FP2 in which position error occurs in the target trajectory TP2 relative to the target trajectory TP2. The MPU 60 detects positional information or the like including the positioning error at the time of writing the track TR2. The MPU 60 writes the track TR3 along the target trajectory TP3 setting the trajectory FP2 of the track TR2 as the target trajectory TP3 through the ATC function. The MPU 60 detects positional information or the like at the time of writing the track TR3.

In this way, the magnetic disk device 1 controls a read track width of each track by generating the target trajectory of the current track based on the positional information of the adjacent track through the ATC function.

Figure 5:
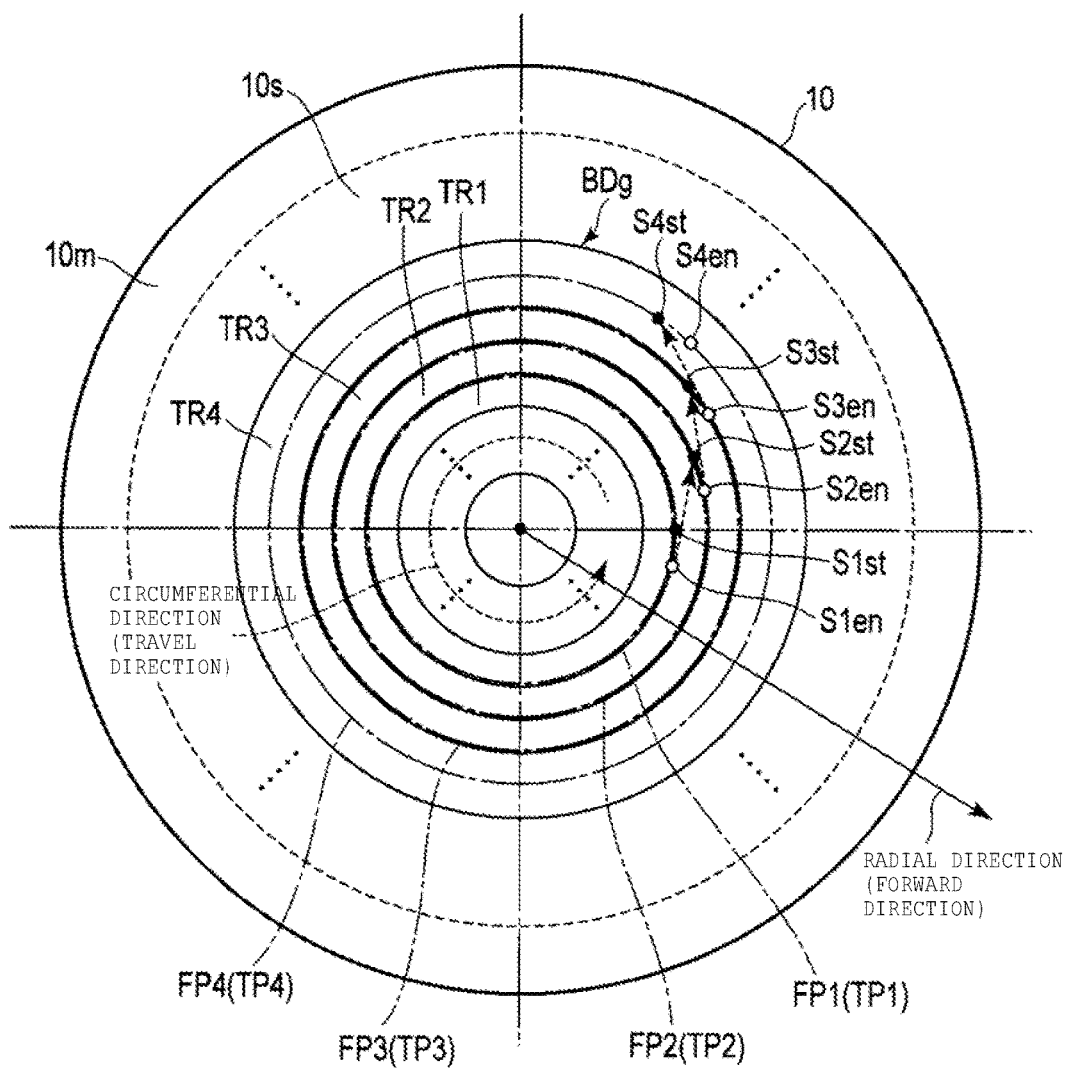
FIG. 5 is a schematic diagram illustrating a plurality of tracks sequentially written in a band region on a disk.

FIG. 5 is a schematic diagram illustrating an example of a plurality of tracks sequentially written in the band region BDg on the disk 10. FIG. 5 illustrates an example of movement of the head 15 (in particular, the write head 15W) between the tracks when data is sequentially written. In FIG. 5, the first tracks TR1, TR2, and TR3 and the second track TR4 are indicated. In FIG. 5, the starting sector S1*st* of the first track TR1, the ending sector S1*en* of the first track TR1, the starting sector S2*st* of the first track TR2, the ending sector S2*en* of the first track TR2, the starting sector S3*st* of the first track TR3, the ending sector S3*en* of the first track TR3, and the starting sector S4*st* of the second track TR4, and the ending sector S4*en* of the second track TR4 are indicated. In FIG. 5, to facilitate the description, it is assumed that the target trajectory TP1 and the trajectory FP1 of the first track TR1 are the same, the target trajectory TP2 and the trajectory FP2 of the first track TR2 are the same, the target trajectory TP3 and the trajectory FP3 of the first track TR3 are the same, and the target trajectory TP4 and the trajectory FP4 of the second track TR4 are the same.

First, the MPU 60 sequentially writes the first track TR1 along the trajectory FP1 from the starting sector S1*st* to the ending sector S1*en* in the shingled recording region 10*s*. Next, the MPU 60 moves the head 15 along the target trajectory TP2 of the first track TR2 in the forward direction in the first track TR1 (i.e., executes track jumping). The MPU 60 sequentially writes the first track TR2 along the trajectory FP2 from the starting sector S2*st* to the ending sector S2*en* in the shingled recording region 10*s*. The MPU 60 moves the head 15 along the target trajectory TP3 of the first track TR3 in the forward direction in the first track TR2. The MPU 60 sequentially writes the first track TR3 along the trajectory FP3 from the starting sector S3*st* to the ending sector S3*en* in the shingled recording region 10*s*. The MPU 60 moves the head 15 along the target trajectory TP4 of the second track TR4 in the forward direction in the first track TR3. The MPU sequentially writes the second track TR4 along the trajectory FP4 from the starting sector S4*st* to the ending sector S4*en* in the shingled recording region 10*s*.

As illustrated in FIG. 5, when data is sequentially written in the starting sector of a track that is adjacent to the current track and on the forward direction side of the current track (hereinafter referred to as a subsequent adjacent track), the head 15 is moved from the final sector of the current track to the first sector of the subsequent adjacent track. Therefore, deviation in a position occurs in the circumferential direction between the first sector of the current track and the first sector of the subsequent adjacent track by a degree corresponding to a seek time which is a time necessary for positioning between the tracks. For example, the MPU 60 writes the starting sector S2*st* of the first track TR2 at a position farther in the travel (i.e., circumferential) direction than the starting sector S1*st* of the first track TR1 is in the circumferential direction. When the head 15 is moved from the ending sector of the adjacent track to the first sector of the current track, the MPU 60 can write a data pattern of the first sector at a position deviating in the radial direction from the target trajectory (i.e., the target position) of the current track. Even when the head 15 is moved to the starting sector for subsequently written data that is adjacent to the ending sector of sequentially written data in a certain track, the MPU 60 can write a data pattern for the starting sector at a position that may deviate in the radial direction from the target trajectory of the current track.

Figure 6:
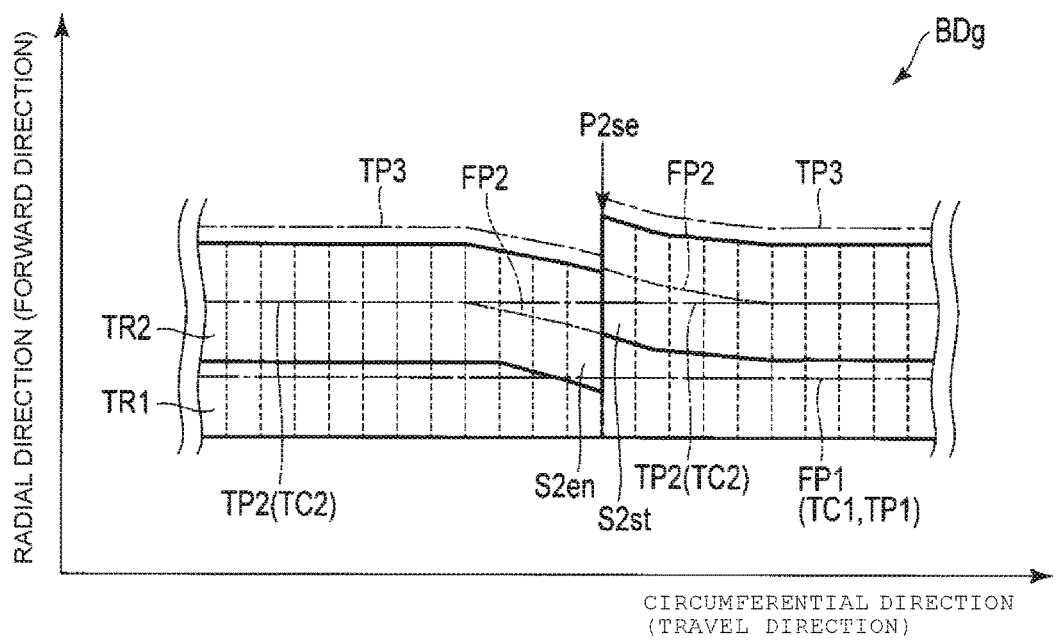
FIG. 6 is a diagram illustrating tracks written circularly once.

FIG. 6 is a diagram illustrating an example of tracks written across a single revolution of disk 10. In FIG. 6, the tracks TR1 and TR2 written in the band region BDg are illustrated. The track TR1 is written along the trajectory FP1 formed along the target trajectory TP1, where the track center TC1 is set as the target trajectory TP1. The track TR2 overwrites a part of the track TR1. The track TR2 is written along the trajectory FP2, where the track center TC2 is set as the target trajectory TP2. In FIG. 6, a boundary position P2*se* between the starting sector S2*st* and the ending sector S2*en* of the track TR2 is indicated. In FIG. 6, the target trajectory TP3 of the subsequent adjacent track, which is generated based on the trajectory FP2 via the ATC function, is illustrated.

In the example illustrated in FIG. 6, the trajectory FP2 is discontinuous at the boundary position P2*se*. That is, in the track TR2, the starting sector S2*st* deviates from the target trajectory TP2 in the forward direction. In addition, in the track TR2, the ending sector S2*en* deviates from the target trajectory TP2 in the opposite direction to the forward direction. In this case, the MPU 60 generates, via the ATC function, the target trajectory TP3 of the track TR3, which is discontinuous in the forward direction at the boundary position P2*se* of the track TR2, based on the trajectory FP2 of the track TR2.

Figure 7:
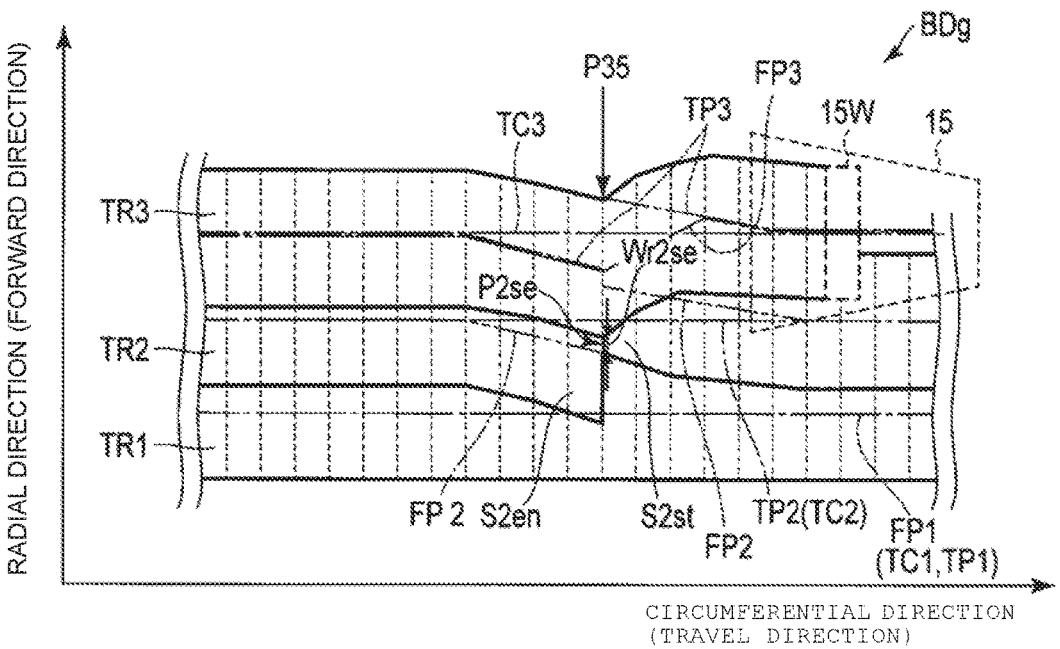
FIG. 7 is a diagram illustrating tracks written along a target trajectory generated through a normal ATC function.

FIG. 7 is a diagram illustrating an example of the track TR3 written along the target trajectory TP3, where target trajectory TP3 is generated in a conventional fashion, e.g., by a normal ATC function. In FIG. 7, the track TR3 is shown, and is written along the trajectory FP3 formed along the target trajectory TP3, where the target trajectory TP3 is generated based on the trajectory FP2 of the track TR2 illustrated in FIG. 6 through the normal ATC function. A position P35 of the track TR3, which is located in the forward direction from the boundary position P2*se* of the track TR2, is indicated. The target trajectory TP3 is discontinuous at the position P35. Specifically, at the position P35, and at a portion of target trajectory TP3 that is adjacent to the position P35 and extends from position P35 in the opposite direction from the travel direction, the target trajectory TP3 is offset from the track center TC3, in the direction opposite to the radial direction. In addition, at the position P35, and at a portion of target trajectory TP3 that is adjacent to the position P35 and extends from position P35 in the travel direction, the target trajectory TP3 is offset from the track center TC3 in the forward direction.

There is a restriction on an operation frequency bandwidth in the VCM 14. Therefore, when the target trajectory abruptly changes, the MPU 60 cannot move the head 15 to follow such a change, and instead radially moves the head 15 slower than the abrupt change in the target trajectory indicates, since the MPU 60 cannot instantaneously move the head 15 in that way. In the example illustrated in FIG. 7, the MPU 60 writes the track TR3 along the target trajectory TP3 up to the position P35 of the track TR3, and therefore track TR3 is offset from the track center TC3 in the opposite direction to the forward direction up to the position P35 of the track TR3. Since the target trajectory TP3 is discontinuous at the position P35, but the MPU 60 cannot write track TR3 in such a discontinuous way, in the travel direction from the position P35 the MPU 60 writes the track TR3 along the trajectory FP3 as shown, which slightly overlaps the target trajectory TP3 at portions of target trajectory TP3 in the travel direction from the position P35. When the track is written in this way, the read track width of the track TR2 is compressed, i.e., significantly narrowed. For example, a read track width Wr2*se* of the track TR2 at boundary position P2*se* of the starting sector S2*st* is significantly narrower than other portions of track TR2.

Figure 8:
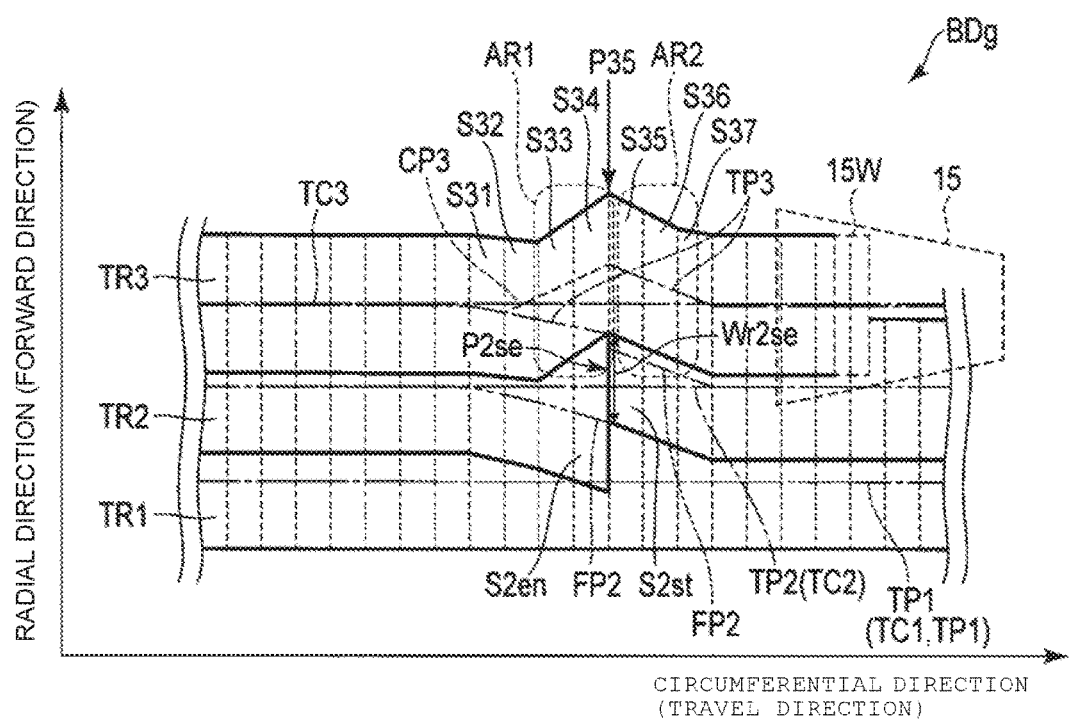
FIG. 8 is a diagram illustrating tracks written along a corrected trajectory obtained by correcting the target trajectory generated through the ATC function according to the first embodiment.

FIG. 8 is a diagram illustrating an example of the track TR3 written along the corrected trajectory CP3 obtained by correcting the target trajectory TP3 generated by an ATC or other conventional function according to the first embodiment. In FIG. 8, the target trajectory TP3 and the track TR3 are shown. Target trajectory TP3 is generated based on the trajectory FP2 of the track TR2 illustrated in FIG. 6 through the ATC function, while the track TR3 shown in FIG. 8 is written along the corrected trajectory CP3 obtained by correcting a part of the target trajectory TP3.

In the example illustrated in FIG. 8, the MPU 60 writes the track TR3 along the target trajectory TP3 up to the sector S31 of the track TR3. The MPU 60 detects whether the sector k sectors ahead of sector S31 (i.e., k sectors in the travel direction from sector S31) is the starting sector of the track TR2. For example, in the embodiment illustrated in FIG. 8, k=4. Thus, the MPU 60 detects whether the sector of the track on the opposite side of track TR3 from the forward direction is the starting sector. When the MPU 60 determines that the sector S2*st* is the starting sector, the MPU 60 detects whether the sector S2*st* and the sector S2*en* of the track TR2 deviate from each other in the radial direction. That is, the MPU 60 determines whether the track TR2 is discontinuous at the point P35. When the MPU 60 detects that the sector S2*st* and the sector S2*en* deviate from each other in the radial direction, the MPU 60 detects an offset direction and an offset amount of the sector S2*st* with respect to the target trajectory TP2. When the MPU 60 determines that the sector S2*st* is offset in the forward direction with respect to the target trajectory TP2, the MPU 60 generates correction values for the sector S31 of the TR3 and for the remaining k sectors up to the sector S35. These correction values are determined based on the offset amount of the sector S2*st* with respect to the target trajectory TP2. That is, the MPU 60 generates correction values for the k sectors of the current track that are circumferentially disposed between the sector S31 and the initial sector (the sector S2*st*) of the previously written track. For example, the MPU 60 generates the correction values for the sectors S32, S33, S34 between the sector S31 and the sector S35 so that the target trajectory TP3 in the sector S31 of the track TR3 is continuously connected to the target trajectory TP3 in the sector S35. The MPU 60 writes the track TR3 along the corrected trajectory CP3 passing through the correction values determined for the sectors S32 to S35. The MPU 60 then writes the track TR3 along the target position TP3 in each sector from the sector S35 onward in the circumferential direction from the position P35. The track TR3 written in this way includes a region AR1 having a positive slope (i.e., sloping upward in FIG. 8 in the forward direction) from the sector S33 to the position P35 and a region AR2 having a negative slope (i.e., sloping downward in FIG. 8 in the opposite direction to the forward direction) from the position P35 to a sector S37. In the track TR3, the sectors from the sector S33 to the sector S36 are offset in the forward direction with respect to the track center. The sectors S34 and S35 are located in the forward direction from the sector S31. As described above, when the MPU 60 detects that (1) the trajectory FP2 of the track TR2 is discontinuous between the starting sector S2*st* and (2) the ending sector S2*en* of the track TR2 and the starting sector S2*st* of the track TR2 are offset in the forward direction with respect to the target trajectory TP2, the MPU 60 writes the track TR3 along the corrected trajectory CP3 in the sectors before the position P35, for example, from the sector S31 to the sector S34. When the track is written in this way, the read track width of the track TR2 is not compressed or reduced in width. For example, the read track width Wr2*se* of the boundary position P2*se* of the starting sector S2*st* of the track TR2 is maintained with a width at which data can be read. As described above, the MPU 60 detects whether the sector that is adjacent to (on the opposite side from the forward direction side) the sector that is k sectors ahead of the current sector is the starting sector. In the embodiment illustrated in FIG. 8, k=4. However, the MPU 60 may detect whether the sector that is adjacent to the sector that is k sectors ahead of the current sector is the starting sector by a number other than 4.

Figure 9A:
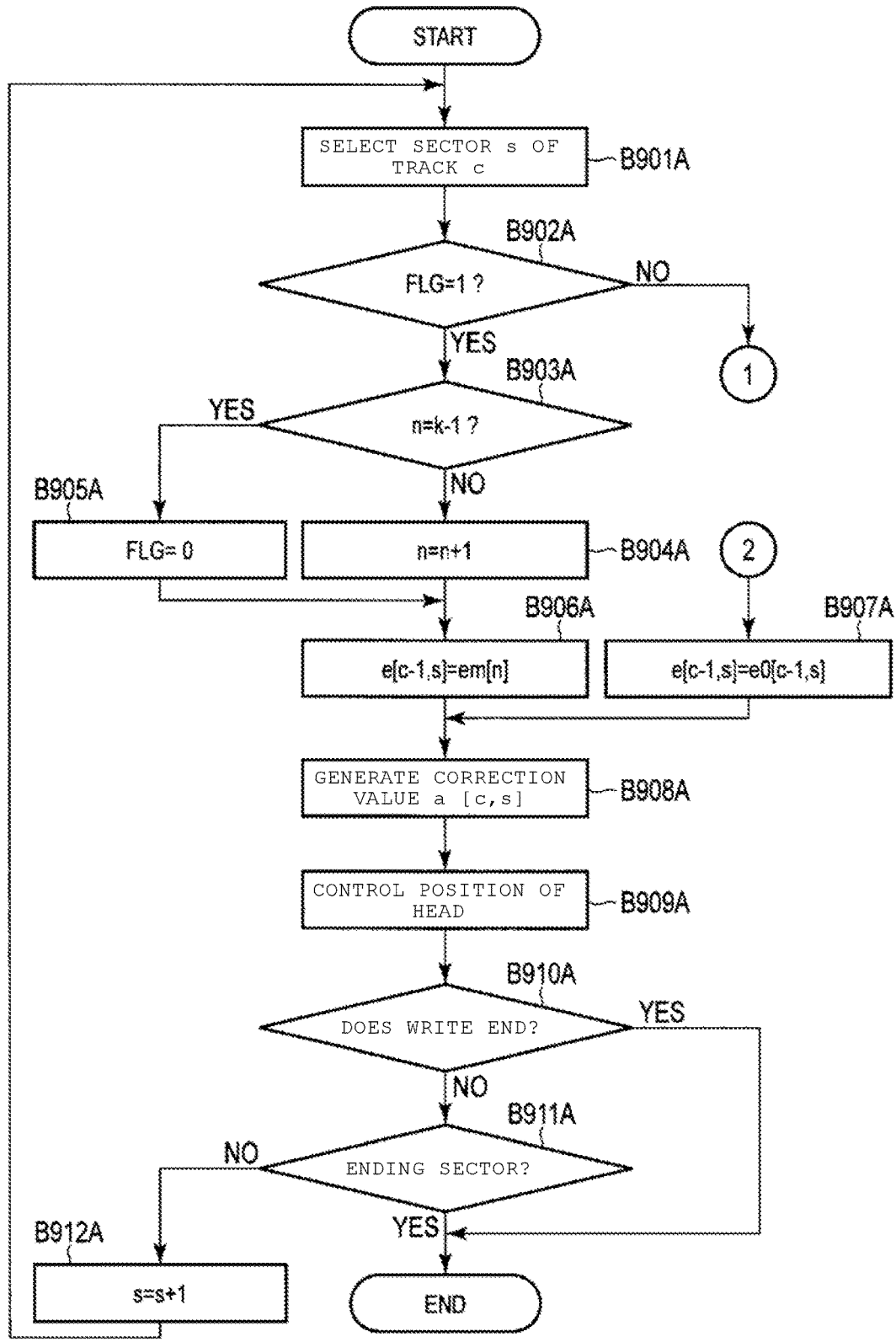
FIG. 9A is a flowchart illustrating a first portion of a write process by the magnetic disk device according to the first embodiment.

FIGS. 9A and 9B are flowcharts illustrating an example of a write process by the magnetic disk device 1 according to the embodiment.

The MPU 60 selects the current sector s of the current track c (B901A). The MPU 60 detects whether the flag FLG is "1" or "0" (B902A). When the MPU 60 detects that the flag FLG is "0" (NO in B902A), the process proceeds to Process 1 of FIG. 9B.

In FIG. 9B, when the process proceeds to Process 1, the MPU 60 acquires the bit st [c−1, s+k] and the positioning error e [c−1, s+k] (B901B). The MPU 60 detects whether the bit st [c−1, s+k]=1 is satisfied (B902B). That is, the MPU 60 detects whether the sector [c−1, s+k] of the adjacent track c−1 corresponding to the bit st [c−1, s+k] is the starting sector. When the MPU 60 detects that the bit st [c−1, s+k]=1 is not satisfied (NO in B902B), the process proceeds to Process 2 of FIG. 9A. When the MPU 60 detects that the bit st [c−1, s+k]=1 is satisfied (YES of B902B), the MPU 60 detects whether the positioning error e [c−1, s+k] of the sector [c−1, s+k] is the same as the positioning error e [c−1, s+k−1] of the sector [c−1, s+k−1] (B903B). That is, the MPU 60 determines whether the starting sector [c−1, s+k] deviates from the ending sector [c−1, s+k−1]. When the MPU 60 detects that the positioning error e [c−1, s+k]=the positioning error e [c−1, s+k−1] is satisfied (YES in B903B), the process proceeds to Process 2 of FIG. 9A. When the MPU 60 detects that the positioning error e [c−1, s+k]=the positioning error e [c−1, s+k−1] is not satisfied (NO in B903B), the MPU 60 detects whether the positioning error e [c−1, s+k]>0 is satisfied (B904B). That is, the MPU 60 detects whether the starting sector [c−1, s+k] of the adjacent track is offset in the forward direction with respect to the target position. When the MPU 60 detects that the starting sector [c−1, s+k] of the adjacent track is not offset in the forward direction with respect to the target position (NO in B904B), the process proceeds to Process 2 of FIG. 9A. When the MPU 60 detects that the starting sector [c−1, s+k] of the adjacent track is offset in the forward direction with respect to the target position (YES in B904B), the MPU 60 outputs the flag FLG=1 (B905B). That is, the MPU 60 selects correction of the target position of the head 15 generated through the ATC function. The MPU 60 clears the number of counts of the correction value (n=0) (B906B) and generates the correction values em [n] (where n=1, 2, . . . , k−1) (B907B), and then process proceeds to Process 2 of FIG. 9A.

In FIG. 9A, when the MPU 60 detects whether the flag FLG is "1" (YES in B902A), the MPU 60 detects that n=k−1 is satisfied (B903A). That is, the MPU 60 detects whether the correction value is the final correction value em [k−1]. When the correction value is not n=k−1 (NO in B903A), the MPU 60 sets n=n+1. That is, the MPU 60 generates the subsequent correction value em [n] (B904A). When the MPU 60 detects that the correction value is n=k−1 (YES in B903A), the MPU 60 outputs a signal for clearing the flag, for example, the flag FLG=0 (B905A). That is, the MPU 60 selects correction of the target position through the normal ATC function. The MPU 60 sets e [c−1, s]=em [n] (B906A). That is, the MPU 60 sets the correction value em [n] as the positioning error e [c−1, s] of the sector s of the adjacent track c−1. After Process 2, the MPU 60 sets [c−1, s]=e0 [c−1, s] (B907A). That is, the MPU 60 sets e0 [c−1, s] as the positioning error e [c−1, s] of the sector s of the adjacent track c−1.

The MPU 60 generates a correction value a [c, s] for the sector s of the current track c from the positioning error e [c−1, s] of the sector s of the adjacent track c−1 (B908A). The MPU 60 controls the position of the head 15 using the correction value a [c, s] (B909A). The MPU 60 writes data in the current sector [c, s]. The MPU 60 detects whether the writing ends (B910A). When the MPU 60 detects that the writing ends (YES in B910A), the process ends. When the MPU 60 detects that the writing does not end (NO in B910A), the MPU 60 detects whether the sector is the ending sector (B911A). When the MPU 60 detects that the sector is not the ending sector (NO in B911A), the MPU 60 set s=s+1 (B912A). That is, the MPU 60 selects the head 15 in the subsequent sector s+1. When the MPU 60 detects that the sector is the ending sector (YES in B911A), the MPU 60 ends the process.

In the embodiment, the magnetic disk device 1 detects the starting sector of the adjacent track in the travel direction and detects the offset direction of the starting sector with respect to the target position of the adjacent track. When the magnetic disk device 1 detects that the starting sector and the ending sector of the adjacent track deviate from each other in the radial direction and detects that the starting sector of the adjacent track is offset in the forward direction with respect to the target position, the magnetic disk device 1 generates a corrected trajectory obtained by correcting the target trajectory in the current track generated through the normal ATC function according to the offset amount of the starting sector. The magnetic disk device 1 can prevent the read track width from being compressed or otherwise reduced in the starting sector of the adjacent track by writing the current track along the corrected trajectory. As a result, the reliability of the magnetic disk device 1 is improved.

Next, a magnetic disk device and a write method according to another embodiment will be described. In the further embodiment, the same reference numerals are given to the same elements as those of the above-described embodiment, and a detailed description thereof is omitted.

Modified Example 1

The magnetic disk device 1 according to Modified Example 1 is different from the magnetic disk device 1 according to the first embodiment in that correction values of a current sector of a current track to a sector advancing from a sector in which the target trajectory is discontinuous with the immediately previous sector are generated when a target trajectory generated through an ATC function is discontinuous.

Figure 10:
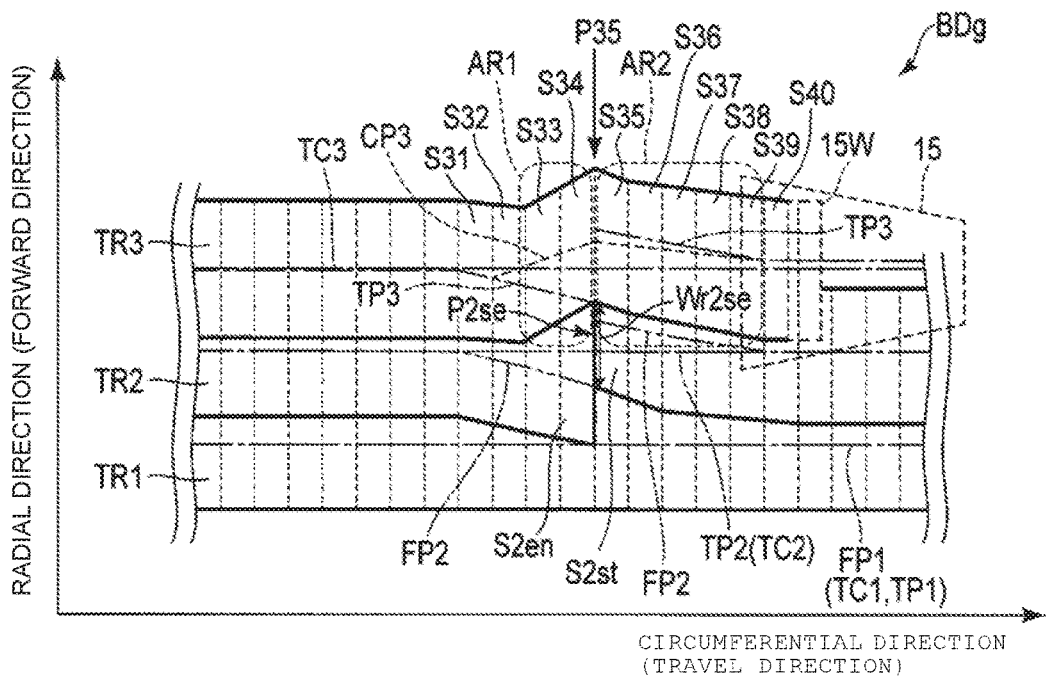
FIG. 10 is a diagram illustrating tracks written along a corrected trajectory obtained by correcting a target trajectory generated through an ATC function according to Modification Example 1.

FIG. 10 is a diagram illustrating an example of the track TR3 written along the corrected trajectory CP3 according to Modified Example 1, where the corrected trajectory CP3 is obtained by correcting the target trajectory TP3 that is generated via the ATC function. In FIG. 10, the track TR3 is shown written along the target trajectory TP3 generated based on the trajectory FP2 of the track TR2 illustrated in FIG. 6, and the track TR3 is shown written along the corrected trajectory CP3 obtained by correcting a part of the target trajectory TP3 through the ATC function.

In the example illustrated in FIG. 10, the MPU 60 writes the track TR3 along the target trajectory TP3 up to the sector S31 of the track TR3. The MPU 60 detects whether the sector leading the current sector, i.e., sector S31, by k sectors in the travel direction, is adjacent to the starting sector for the track that is adjacent to track TR3 and on the side of the track TR3 that is opposite the radial direction. That is, in the embodiment illustrated in FIG. 10, the MPU 60 determines whether sector S2*st* of the track TR2 is the starting sector for track TR2. When the MPU 60 determines that the sector S2*st* is the starting sector, the MPU 60 determines whether the sector S2*st* and the starting sector of track TR (the sector S2*en*) deviate from each other in the radial direction. When the MPU 60 determines that the start sector (the sector S2*st*) and the end sector (the sector S2*en*) deviate from each other in the radial direction, the MPU 60 determines an offset direction of the sector S2*st* with respect to the target trajectory TP2. When the MPU 60 determines that the sector S2*st* is offset in the forward direction with respect to the target trajectory TP2, the MPU 60 generates correction values for sectors from the current sector (the sector S31) of the track TR3 to a number of sectors beyond the k sectors between the current sector and the start sector. For example, in one embodiment, the MPU 60 generates correction values for k+5 sectors. The correction values are generated based on to the offset amount of the sector S2*st*. At this time, the MPU 60 generates the correction values for the sectors from the sector S32 to the sector S34 of the track TR3 so that a trajectory of the head 15 changes in the forward direction with respect to the target trajectory TP3. The MPU 60 generates correction values for the sectors from the sector S35 to the sector S39 of the track TR3 so that a trajectory is offset in the opposite direction to the forward direction with respect to the target trajectory TP3. The MPU 60 writes the track TR3 along the corrected trajectory CP3 passing through the correction values from the sector S32 to the sector S39. The MPU 60 writes the track TR3 along the target position TP3 in the sectors from the sector S39 onward in the travel direction. The track TR3 written in this way includes a region AR1 having an upward slope (i.e., inclined in the forward direction) from the sector S33 to the position P35 and a region AR2 having a downward slope (i.e., inclined in the opposite direction to the forward direction) from the position P35 to the sector S39. In the track TR3, the sectors from the sector S33 to the sector S39 are offset in the forward direction with respect to the track center. The sectors S34 and S35 are located in the forward direction from the sector S31. As described above, the MPU 60 generates a gently changing corrected trajectory by generating the correction values for the sectors from the sector S31 to the sector S40 of the track TR2, i.e., for the k+5 sectors that follow the sector S31 in the travel direction. When the corrected trajectory is generated in this way, the read track width of the track TR2 is not reduced or otherwise compressed.

According to Modification Example 1, the magnetic disk device 1 generates the correction values for several sectors past (in the travel direction) the sector of the current track that corresponds to the starting sector of the adjacent track, i.e., past the sector of the current track that is located in the forward direction of the starting sector of the adjacent track. Therefore, the magnetic disk device 1 generates a corrected trajectory that changes more gently than the corrected trajectory described in the embodiment described above in conjunction with FIG. 8. The magnetic disk device 1 can prevent the read track width from being contracted in the starting sector of the adjacent track. In addition, the magnetic disk device 1 can reduce the offset amount of the current track in the forward direction. As a result, the magnetic disk device 1 can generally operate with improved reliability.

Modified Example 2

The magnetic disk device 1 according to <Modified Example 2 is different from the magnetic disk device 1 according to the first embodiment in that a trajectory for sectors up to a sector of a current track that is located in the forward direction of a starting sector of the adjacent track is generated based on a track center when a target trajectory generated through an ATC function is discontinuous.

Figure 11:
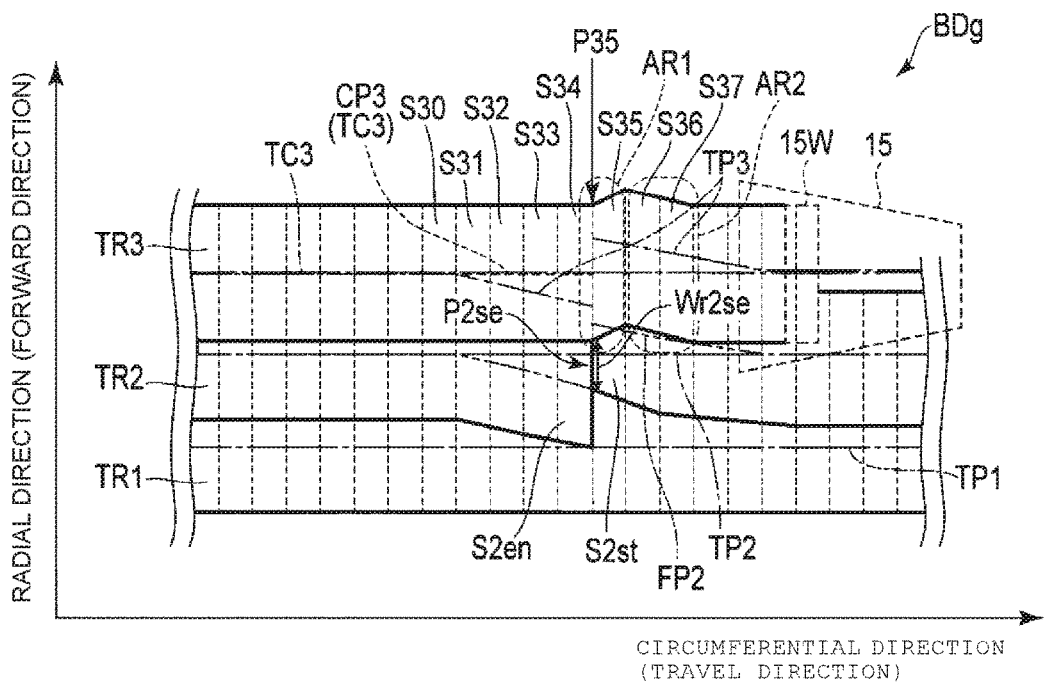
FIG. 11 is a diagram illustrating tracks written along a corrected trajectory obtained by correcting a target trajectory generated through an ATC function according to Modification Example 2.

FIG. 11 is a diagram illustrating an example of the track TR3 written along the corrected trajectory CP3 obtained by correcting the target trajectory TP3 generated through the ATC function according to Modified Example 2. In FIG. 11, the track TR3 is shown written along the target trajectory TP3 and is generated based on the trajectory FP2 of the track TR2 illustrated in FIG. 6, and the track TR3 is shown written along the corrected trajectory CP3 obtained by correcting a part of the target trajectory TP3 through the ATC function.

In the example illustrated in FIG. 11, the MPU 60 writes the track TR3 along the target trajectory TP3 up to the sector S30 of the track TR3. The MPU 60 detects whether the sector in the adjacent track that leads the current sector by k sectors, i.e., the sector S2*st* of the track TR2, is the starting sector for track TR2. When the MPU 60 determines that the sector S2*st* is the starting sector, the MPU 60 determines whether the sector S2*st* and the sector immediately preceding sector S2*st* (i.e., the sector S2*se*) of the track TR2 deviate from each other in the radial direction. When the MPU 60 determines that the sector S2*st* and the sector S2*en* deviate from each other in the radial direction, the MPU 60 determines an offset direction and the offset amount of the sector S2*st* with respect to the target trajectory TP2. When the MPU 60 determines that the sector S2*st* is offset in the forward direction with respect to the target trajectory TP2, the MPU 60 generates correction values for sectors from a sector S30 of the track TR3 to the sector S35, which leads sector S30 by k=5 sectors in the travel direction. The MPU 60 generates these correction values based on the determined offset amount of the sector S2*st*. At this time, the MPU 60 generates the correction values for the sectors from the sector S31 to the sector S34 of the track TR3 based on the track center of the track TR3. The MPU 60 writes the track TR3 along the corrected trajectory CP3 as shown, so that track TR3 passes through each of the sectors S31 to S34 based on the correction values. The MPU 60 writes the track TR3 along the target position TP3 in the sectors past the sector S35 in the travel direction. The track TR3, when written in this way, includes a region AR1 having an upward slope (i.e., is inclined in the forward direction) from the sector S35 to the sector S37, and a region AR2 having a negative slope (i.e., is inclined in the opposite direction to the forward direction) from the sector S35 to the sector S37. In the track TR3, the sectors from the sector S35 to the sector S37 are offset from the track center in the forward direction. The sectors S35 and S36 are also located in the forward direction from the sector S31.

According to Modified Example 2, when the magnetic disk device 1 detects that (1) the trajectory FP2 of the track TR2 is discontinuous with the starting sector S2*st* and the ending sector S2*en* of the track TR2, and (2) the starting sector S2*st* of the track TR2 is offset in the forward direction with respect to the target trajectory TP2, the magnetic disk device 1 writes the current track along the corrected trajectory based on the track center up to the sector of the current track located in the forward direction of the starting sector of the adjacent track. Therefore, the magnetic disk device 1 can prevent the read track width from being compressed or otherwise reduced in the starting sector of the adjacent track. As a result, the magnetic disk device 1 can operate with improved reliability.

Second Embodiment

The magnetic disk device 1 according to a second embodiment is different from that according to the above-described embodiment in that a corrected trajectory connecting an ending sector to a starting sector of a current track is employed. Specifically, such a corrected trajectory is employed when magnetic disk device 1 determines that the starting sector of the current track is offset in the forward direction with respect to the target trajectory.

Figure 12:
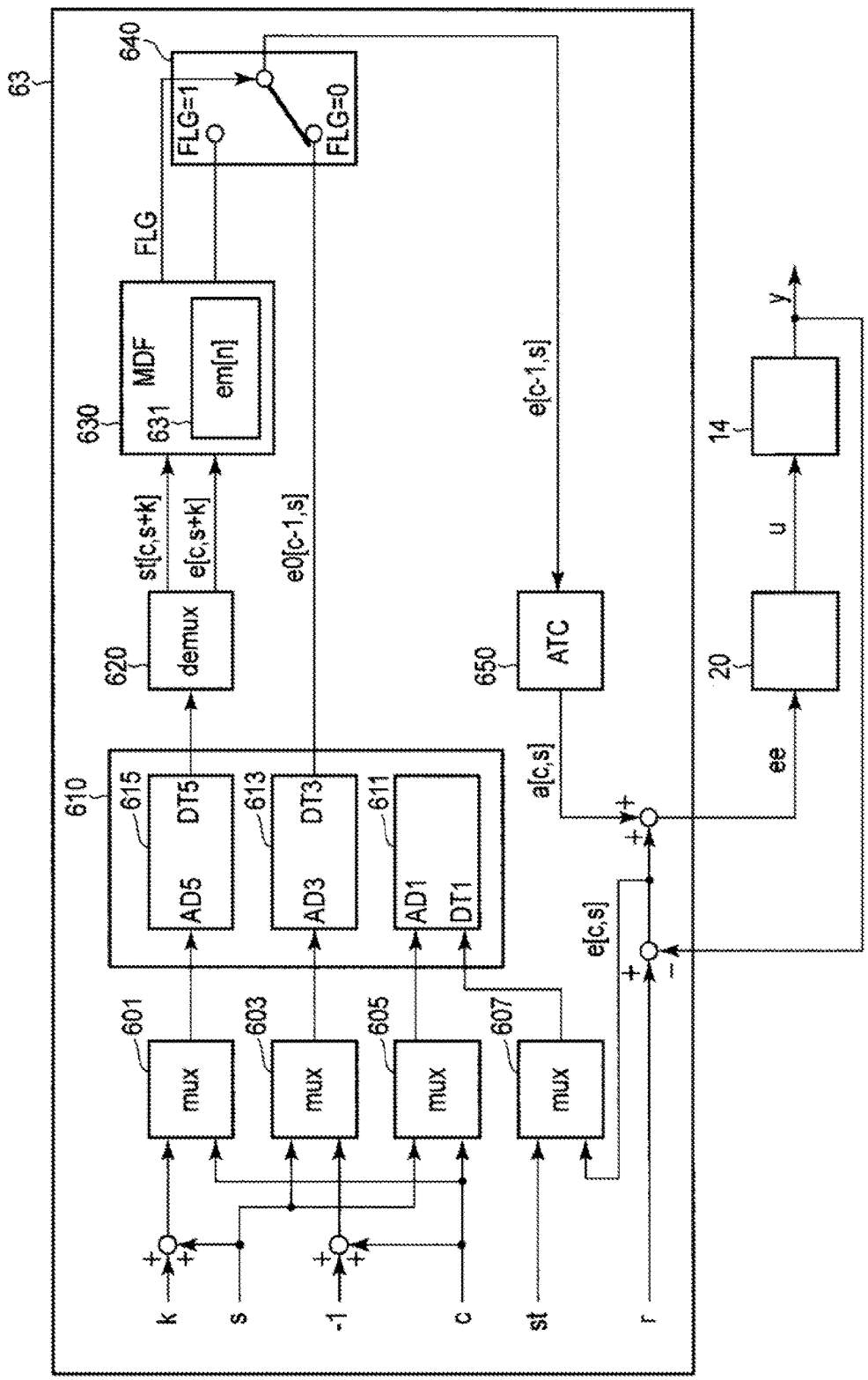
FIG. 12 is a block diagram illustrating a configuration of a servo control unit according to a second embodiment.

FIG. 12 is a block diagram illustrating an example of the configuration of the servo control unit 63 according to the second embodiment.

A sector number s+k obtained by adding the number of sectors k to a current sector number s, and a current track number c are input to the multiplexer 601. The multiplexer 601 outputs the current track number c that was input and sector number s+k as address information [c, s+k] to, for example, the internal memory 610.

The read access unit 615 designates a sector of the address information [c, s+k] (hereinafter referred to as the sector [c, s+k]) that was input from the multiplexer 601, via the terminal AD5. The read access unit 615 reads data including positioning error e [c, s+k] and a bit st [c, s+k] corresponding to the sector [c, s+k] to the terminal DT5 and outputs the data to the demultiplexer 620.

The demultiplexer 620 divides the data including the positioning error e [c, s+k] and the bit st [c, s+k] input from the read access unit 615 into the positioning error e [c, s+k] and the bit st [c, s+k] and outputs the positioning error e [c, s+k] and the bit st [c, s+k] to the correction unit 630.

The correction unit 630 detects the starting sector of the current track in the travel direction with reference to the input signal. When the correction unit 630 detects the starting sector of the current track in the travel direction, the correction unit 630 detects an offset direction and an offset amount of the starting sector of the current track with respect to the target position. The correction unit 630 generates a correction value for correcting the target position of the current track according to the offset direction and the offset amount of the starting sector of the current track with respect to the target position.

For example, the correction unit 630 detects the starting sector in the travel direction with reference to the input positioning error e [c, s+k] and bit st [c, s+k]. When the correction unit 630 detects a rising bit st [c, s+k] (for example, st [c, s+k]=1), the correction unit 630 determines that the sector [c, s+k] corresponding to the bit st [c, s+k] is the starting sector [c, 1]. The correction unit 630 detects whether the positioning error e [c, s+k] (e [c, 1]) in the starting sector [c, s+k] ([c, 1]) of the current track c is greater than zero "0" (e [c, s+k]>0) or is equal to or less than zero "0" (e [c, s+k] 0). That is, the correction unit 630 detects whether the sector [c, s+k] of the current track is offset in the forward direction with respect to the target position. When the correction unit 630 detects that the positioning error e [c, s+k] is greater than zero, the correction unit 630 determines that the starting sector [c, s+k] of the current track is offset with respect to the target position in the forward direction. When the correction unit 630 detects that the starting sector [c, s+k] of the current track is the starting sector [c, 1] and detects that the starting sector [c, s+k] ([c, 1]) of the current track is offset in the forward direction with respect to the target position, the correction unit 630 generates correction values for correcting the target positions of several sectors of the current track. For example, the correction unit 630 generates correction values em [n] (where n=1, 2, . . . , k−1) for sectors from the sector [c, s] to the sector [c, s+k] so that the head 15 passes through a corrected trajectory that continuously connects the target position of the current sector [c, s] to the target position of the sector [c, s+k] ([c,1]) in the current track that is ahead of the current sector [c,s] in the travel direction by k sectors. When the correction unit 630 detects that the sector [c, s+k] in the current track that is ahead of the current sector [c,s] in the travel direction by k sectors is the starting sector and detects that the sector [c, s+k] of the current track is offset in the forward direction with respect to the target position, the correction unit 630 outputs a flag FLG for selecting a correction value, for example, a signal with FLG=1, to the switch unit 640. The correction unit 630 outputs the generated correction values em [n] to the switch unit 640.

Figure 13A:
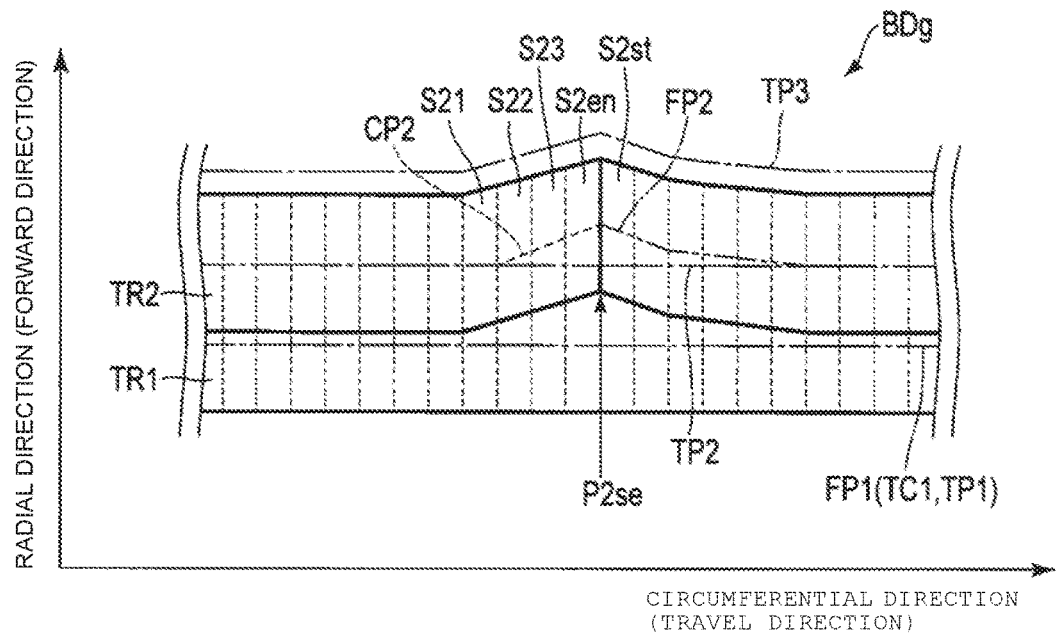
FIG. 13A is a diagram illustrating tracks written along a corrected trajectory obtained by correcting the target trajectory generated through the ATC function according to the second embodiment.
Figure 13B:
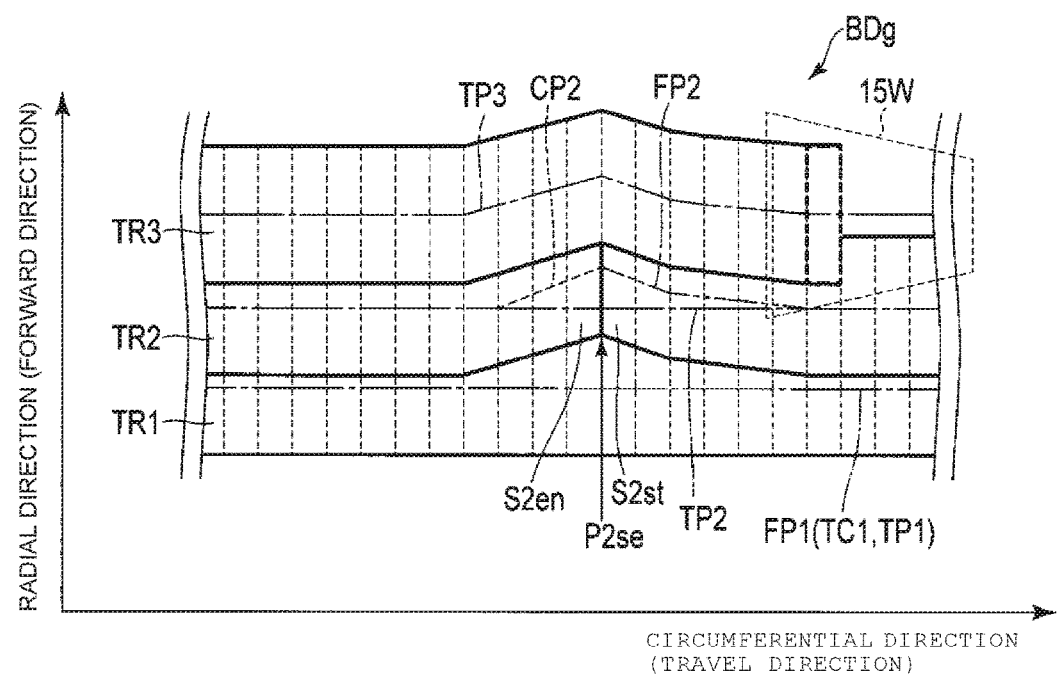
FIG. 13B is a diagram illustrating tracks written along a corrected trajectory obtained by correcting the target trajectory generated through the ATC function according to the second embodiment.

FIG. 13A is a diagram illustrating an example of the track TR2 written along the corrected trajectory CP2, where the corrected trajectory is obtained by correcting the target trajectory TP2 generated via the ATC function, according to the second embodiment. FIG. 13B is a diagram illustrating an example of the track TR3 written along the target trajectory TP3 generated through the ATC function according to the second embodiment. In FIG. 13A, the target trajectory TP2, the track TR2 written along the corrected trajectory CP2 obtained by correcting a part of the target trajectory TP2, and the target trajectory TP3 are shown. The target trajectory TP2 is generated based on the trajectory FP1 of the track TR1, and the target trajectory TP3 is generated based on the corrected trajectory CP2 of the track TR2 through the ATC function. In FIG. 13B, the track TR3 is shown and is generated based on the target trajectory TP3.

In the example illustrated in FIG. 13A, the MPU 60 writes the track TR2 along the target trajectory TP2 up to the sector S21 of the track TR2. The MPU 60 detects whether the sector S2st that is, for example, 4 sectors (=k) ahead of sector S21 is the starting sector in the sector S21 of the track TR2. When the MPU 60 determines that the sector S2st is the starting sector, the MPU 60 detects the offset direction and the offset amount of the sector S2st with respect to the target trajectory TP2. When the MPU 60 determines that the sector S2st is offset in the forward direction with respect to the target trajectory TP2, the MPU 60 generates correction values for the next k sectors in the travel direction, i.e., for each of the sectors from the sector S21 of the track TR2 to the sector S2st. At this time, the MPU 60 generates the correction values for the sectors between the sector S21 and the sector S2st (i.e., the sectors S22, S23, S2en) so that the target trajectory TP2 in the sector S2st of the track TR2 is continuously connected to the target trajectory TP2 in the sector S21. For example, the MPU 60 generates the correction values for the sectors between the sector S22 and the sector S2en. The MPU 60 writes the track TR2 along the corrected trajectory CP2, moving the head 15 based on the correction values for the sectors between the sector S22 and the sector S2en, then moves the head 15 to the starting sector of the subsequent adjacent track (the track TR3). As illustrated in FIG. 13B, the MPU 60 writes the track TR3 along the target trajectory TP3, which is generated based on the track TR2. In the track TR3 written in this way, the starting sector and the ending sector are continuously connected. Therefore, when the track TR3 overwrites a portion of the track TR2, the read track width of the track TR2 is not contracted. For example, the read track width Wr2se at the boundary position P2se of the starting sector S2st of the track TR2 is maintained at a width at which data can be read.

Figure 14:
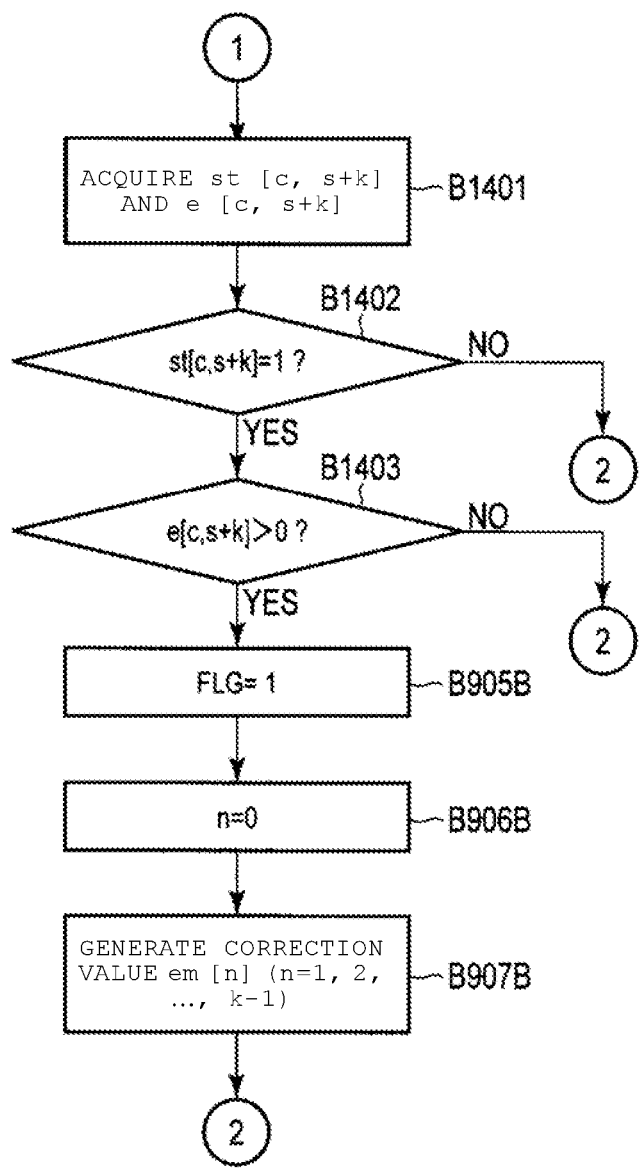
FIG. 14 is a flowchart illustrating a write process by the magnetic disk device according to the second embodiment.

FIG. 14 is a flowchart illustrating an example of a write process by the magnetic disk device 1 according to the embodiment. FIG. 14 corresponds to the flowchart illustrated in FIG. 9B.

The process proceeds from Process 1 continued from FIG. 9A and the MPU 60 acquires the bit st [c, s+k] and the positioning error e [c, s+k] (B1401). The MPU 60 detects whether the bit st [c, s+k]=1 is satisfied (B1402). That is, the MPU 60 determines whether the sector [c, s+k] of the current track c corresponding to the bit st [c, s+k] is the starting sector. When the MPU 60 determines whether the bit st [c, s+k]=1 is not satisfied (NO in B1402), the MPU 60 causes the process to proceed to Process 2 of FIG. 9A. When the MPU 60 determines that the bit st [c, s+k]=1 is satisfied (YES in B1402), the MPU 60 determines whether the positioning error e [c, s+k]>0 is satisfied (B1403). That is, the MPU 60 determines whether the starting sector [c, s+k] is offset in the forward direction with respect to the target position. When the MPU 60 determines that the starting sector [c, s+k] is not offset in the forward direction with respect to the target position (NO in B1403), the process proceeds to Process 2 of FIG. 9A. When the MPU 60 determines that the starting sector [c, s+k] is offset in the forward direction with respect to the target position (YES in B1403), the MPU 60 outputs the flag FLG=1 (B905B). The MPU 60 clears the number of counts of the correction value (n=0) (B906B) and generates the correction values em [n] (where n=1, 2, . . . , k) (B907B), and then process proceeds to Process 2 of FIG. 9A.

According to the embodiment, the magnetic disk device 1 detects the starting sector of the current track in the travel direction and detects the offset direction and the offset amount of the starting sector with respect to the target position in the starting sector of the current track. When the starting sector of the current track is offset in the forward direction with respect to the target position, the magnetic disk device 1 generates the corrected trajectory obtained by correcting the target trajectory of the current track according to the offset amount of the starting sector. The magnetic disk device 1 can prevent the read track width from being compressed or otherwise reduced in the starting sector of the current track by writing the current track along the corrected trajectory. As a result, the magnetic disk device 1 can operate with improved reliability.

While the magnetic disk device 1 of the shingled write magnetic recording has been described in the above-described embodiment, the configuration described in the above-described embodiment can also be applied to a conventional magnetic disk device that uses conventional write magnetic recording rather than the shingled write magnetic recording.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the invention. The accompanying claims are intended to cover such configurations or modifications as would fall within the scope and spirit of the invention.

What is claimed is:
1. A magnetic disk device comprising:
a disk;
a head configured to write data on the disk; and
a controller configured to
  generate a target trajectory of the head in a circumferential direction for writing to a plurality of sectors in a current track, wherein the target trajectory is based on an actual trajectory of the head for writing to a plurality of sectors in a previously written track that is adjacent to the current track;
  determine that the previously written track is discontinuous between an initial sector of the previously written track and an end sector of the previously written track by a radial offset;
  based on the radial offset, generate a corrected trajectory for writing the plurality of sectors in the current track; and
  control a position of the head in a radial direction based on the corrected trajectory while writing to the plurality of sectors in the current track.

2. The magnetic disk device according to claim 1, wherein the initial sector of the previously written track is adjacent to end sector of the previously written track.

3. The magnetic disk device according to claim 1, wherein the controller is configured to determine that the previously written track is discontinuous between the initial sector of the previously written track and the end sector of the previously written track by determining that the initial sector of the previously written track is offset from the end sector of the previously written track by the radial offset in a radial direction toward the current track.

4. The magnetic disk device according to claim 1, wherein, prior to generating the corrected trajectory for writing the plurality of sectors in the current track, the controller detects the initial sector of the previously written track.

5. The magnetic disk device according to claim 4, wherein the controller is configured to detect the initial sector of the previously written track while the head is writing data in a write sector of the current track.

6. The magnetic disk device according to claim 4, wherein the controller is configured to generate the corrected trajectory by generating a respective correction value for each of k sectors of the current track that are circumferentially disposed between a write sector of the current track and the initial sector of the previously written track, wherein the write sector is disposed on the target trajectory and each of the k sectors are disposed on the corrected trajectory.

7. The magnetic disk device according to claim 6, wherein the corrected trajectory for the k sectors comprises the target trajectory for each sector of the k sectors modified by the respective correction value for that sector of k sectors.

8. The magnetic disk device according to claim 6, wherein each respective correction value for each of k sectors is selected so that when the head moves along the corrected trajectory, the head can move continuously along the corrected trajectory from the write sector to a sector of the current track that is adjacent to the initial sector of the previously written track.

9. The magnetic disk device according to claim 1, wherein the radial offset is in a radial direction toward the current track and the controller selects the corrected trajectory so that the head moves farther in the radial direction away from the previously written track when following the corrected trajectory than when following the target trajectory.

10. The magnetic disk device according to claim 1, wherein the current track overwrites a portion of the previously written track.

11. A write method applied to a magnetic disk device including a disk and a head which writes data on the disk, the method comprising:
  generating a target trajectory of the head in a circumferential direction for writing to a plurality of sectors in a current track on the disk, wherein the target trajectory is based on an actual trajectory of the head for writing to a plurality of sectors in a previously written track on the disk that is adjacent to the current track;

determining that the previously written track is discontinuous between an initial sector of the previously written track and an end sector of the previously written track by a radial offset;
based on the radial offset, generating a corrected trajectory for writing the plurality of sectors in the current track; and
controlling a position of the head in a radial direction based on the corrected trajectory while writing to the plurality of sectors in the current track.

12. The write method according to claim 11, wherein the initial sector of the previously written track is adjacent to end sector of the previously written track.

13. The write method according to claim 11, wherein determining that the previously written track is discontinuous between the initial sector of the previously written track and the end sector of the previously written track comprises determining that the initial sector of the previously written track is offset from the end sector of the previously written track by the radial offset in a radial direction toward the current track.

14. The write method according to claim 11, further comprising, prior to generating the corrected trajectory for writing the plurality of sectors in the current track, detecting the initial sector of the previously written track.

15. The write method according to claim 14, further comprising detecting the initial sector of the previously written track while the head is writing data in a write sector of the current track.

16. The write method according to claim 14, wherein generating the corrected trajectory comprises generating a respective correction value for each of k sectors of the current track that are circumferentially disposed between a write sector of the current track and the initial sector of the previously written track, wherein the write sector is disposed on the target trajectory and each of the k sectors are disposed on the corrected trajectory.

17. The write method according to claim 16, wherein the corrected trajectory for the k sectors comprises the target trajectory for each sector of the k sectors modified by the respective correction value for that sector of k sectors.

18. The write method according to claim 16, wherein each respective correction value for each of k sectors is selected so that when the head moves along the corrected trajectory, the head can move continuously along the corrected trajectory from the write sector to a sector of the current track that is adjacent to the initial sector of the previously written track.

19. The write method according to claim 11, wherein the radial offset is in a radial direction toward the current track and the controller selects the corrected trajectory so that the head moves farther in the radial direction away from the previously written track when following the corrected trajectory than when following the target trajectory.

20. The write method according to claim 11, wherein the current track overwrites a portion of the previously written track.

* * * * *